United States Patent
Schalkwyk et al.

(10) Patent No.: US 12,249,345 B2
(45) Date of Patent: Mar. 11, 2025

(54) EPHEMERAL LEARNING AND/OR FEDERATED LEARNING OF AUDIO-BASED MACHINE LEARNING MODEL(S) FROM STREAM(S) OF AUDIO DATA GENERATED VIA RADIO STATION(S)

(71) Applicant: GOOGLE LLC, Mountain View, CA (US)

(72) Inventors: Johan Schalkwyk, Scarsdale, NY (US); Blaise Aguera-Arcas, Seattle, WA (US); Diego Melendo Casado, Mountain View, CA (US); Oren Litvin, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 198 days.

(21) Appl. No.: 18/074,739

(22) Filed: Dec. 5, 2022

(65) Prior Publication Data
US 2024/0071406 A1 Feb. 29, 2024

Related U.S. Application Data

(60) Provisional application No. 63/401,399, filed on Aug. 26, 2022.

(51) Int. Cl.
*G10L 25/51* (2013.01)
*G10L 15/00* (2013.01)
*G10L 15/18* (2013.01)

(52) U.S. Cl.
CPC ............ *G10L 25/51* (2013.01); *G10L 15/005* (2013.01); *G10L 15/18* (2013.01)

(58) Field of Classification Search
CPC ....... G10L 25/51; G10L 15/005; G10L 15/18; G10L 25/54; G10L 15/063
(Continued)

(56) References Cited

U.S. PATENT DOCUMENTS

2010/0017829 A1* 1/2010 Spieckerman ......... H04H 60/02
   725/93
2015/0127337 A1* 5/2015 Heigold ................ G10L 15/183
   704/232

(Continued)

OTHER PUBLICATIONS

European Patent Office; International Search Report and Written Opinion issued in Application No. PCT/US2022/052013; 17 pages; dated Jun. 12, 2023.

(Continued)

*Primary Examiner* — Thuykhanh Le
(74) *Attorney, Agent, or Firm* — Gray Ice Higdon

(57) ABSTRACT

Implementations disclosed herein are directed to utilizing ephemeral learning techniques and/or federated learning techniques to update audio-based machine learning (ML) model(s) based on processing streams of audio data generated via radio station(s) across the world. This enables the audio-based ML model(s) to learn representations and/or understand languages across the world, including tail languages for which there is no/minimal audio data. In various implementations, one or more deduping techniques may be utilized to ensure the same stream of audio data is not overutilized in updating the audio-based ML model(s). In various implementations, a given client device may determine whether to employ an ephemeral learning technique or a federated learning technique based on, for instance, a connection status with a remote system. Generally, the streams of audio data are received at client devices, but the ephemeral learning techniques may be implemented at the client device and/or at the remote system.

20 Claims, 9 Drawing Sheets

(58) Field of Classification Search
USPC .......................................................... 704/251
See application file for complete search history.

(56) References Cited

U.S. PATENT DOCUMENTS

| | | | |
|---|---|---|---|
| 2015/0324379 A1 | 11/2015 | Danovitz et al. | |
| 2018/0101784 A1* | 4/2018 | Rolfe | G06F 15/80 |
| 2020/0104278 A1* | 4/2020 | Kindig | H04N 21/4331 |
| 2020/0302149 A1* | 9/2020 | Gottemukkula | G06N 3/084 |
| 2020/0343986 A1* | 10/2020 | Aggarwal | H04H 60/42 |
| 2020/0380215 A1* | 12/2020 | Kannan | G10L 15/005 |
| 2021/0020170 A1* | 1/2021 | Biadsy | G10L 15/02 |
| 2021/0118427 A1* | 4/2021 | Braga | G10L 19/008 |
| 2021/0141768 A1 | 5/2021 | Shanmuganathan | |
| 2021/0273858 A1* | 9/2021 | Radovanovic | G06Q 50/06 |
| 2021/0350795 A1* | 11/2021 | Kenter | G10L 15/02 |
| 2022/0172707 A1* | 6/2022 | Wang | G10L 15/063 |
| 2022/0172727 A1* | 6/2022 | Sharifi | G06F 3/167 |
| 2022/0188639 A1* | 6/2022 | Karlinsky | G06N 3/084 |
| 2022/0208213 A1* | 6/2022 | Watanabe | G06F 40/30 |
| 2022/0230065 A1* | 7/2022 | Berthelot | G06N 3/045 |
| 2022/0238131 A1* | 7/2022 | Park | G10L 25/84 |
| 2022/0254006 A1* | 8/2022 | Jin | G06V 20/44 |
| 2022/0262007 A1* | 8/2022 | Cramer | G06V 10/774 |
| 2022/0270590 A1* | 8/2022 | Beaufays | G06N 3/084 |
| 2022/0277732 A1* | 9/2022 | Zhao | G10L 15/22 |
| 2022/0277764 A1* | 9/2022 | Ciliberti | G16H 40/67 |
| 2022/0293093 A1* | 9/2022 | Beaufays | G10L 15/063 |
| 2022/0335624 A1* | 10/2022 | Maurer | G06N 3/08 |
| 2022/0383887 A1* | 12/2022 | Wang | G10L 25/51 |
| 2023/0053206 A1* | 2/2023 | Wang | G10L 25/51 |
| 2023/0058949 A1* | 2/2023 | Huang | G10L 15/22 |
| 2023/0069908 A1* | 3/2023 | Ando | G10L 15/22 |
| 2023/0075893 A1* | 3/2023 | Su | G10L 15/02 |
| 2023/0077528 A1* | 3/2023 | Erdenee | G10L 15/063 |
| | | | 704/231 |
| 2023/0094828 A1* | 3/2023 | Ramsl | G10L 25/54 |
| | | | 704/235 |
| 2023/0107493 A1* | 4/2023 | Bijwadia | G10L 15/32 |
| | | | 704/270 |
| 2023/0156248 A1* | 5/2023 | Beaufays | H04N 21/232 |
| | | | 700/94 |
| 2023/0162728 A1* | 5/2023 | Jose | G06N 3/084 |
| | | | 704/251 |
| 2023/0173683 A1* | 6/2023 | Gomez | G06F 3/017 |
| | | | 700/246 |
| 2023/0214190 A1* | 7/2023 | Manivasagam | G06N 7/01 |
| | | | 717/102 |
| 2023/0260538 A1* | 8/2023 | Inskip, VI | G10L 15/22 |
| | | | 704/251 |
| 2023/0267943 A1* | 8/2023 | Ke | G10L 25/51 |
| | | | 704/200 |
| 2023/0317082 A1* | 10/2023 | Thakkar | G10L 15/01 |
| | | | 704/231 |
| 2023/0317086 A1* | 10/2023 | Virtanen | G10L 17/26 |
| | | | 704/270 |
| 2023/0360636 A1* | 11/2023 | Fan | G10L 15/063 |
| 2023/0368810 A1* | 11/2023 | Tai | G10L 17/26 |
| 2023/0388197 A1* | 11/2023 | Koodli | G06N 20/00 |
| 2024/0013518 A1* | 1/2024 | Hamilton | G06V 10/82 |
| 2024/0015342 A1* | 1/2024 | Bowman | H04H 60/375 |
| 2024/0039651 A1* | 2/2024 | Komich | H04H 60/80 |
| 2024/0089537 A1* | 3/2024 | Shanmugam | H04N 21/44008 |
| 2024/0265911 A1* | 8/2024 | Assael | G10L 15/26 |
| 2024/0347064 A1* | 10/2024 | Li | G10L 25/30 |

OTHER PUBLICATIONS

Slaney, M. et al., "Locality-Sensitive Hashing for Finding Nearest Neighbors"; IEEE Signal Processing Magazine, vol. 25, No. 2; pp. 128-131; dated Mar. 1, 2008.

European Patent Office; Invitation to Pay Additional Fees issued in Application No. PCT/US2022/052013; 11 pages; dated Apr. 18, 2023.

"Learn How Google Improves Speech Models" 2 pages.

Ester Lagerlof "A Swedish WAV2VEC Versus Google Speech-To-Text" Uppsala Universitet. Bachelor's Thesis in Statistics. 32 pages, dated 2022.

* cited by examiner

EPHEMERAL LEARNING AND/OR FEDERATED LEARNING OF AUDIO-BASED MACHINE LEARNING MODEL(S) FROM STREAM(S) OF AUDIO DATA GENERATED VIA RADIO STATION(S)

BACKGROUND

Federated learning of machine learning (ML) model(s) is an increasingly popular ML technique for updating ML model(s). In traditional federated learning, an on-device ML model is stored locally on a client device of a user, and a global ML model, that is a cloud-based counterpart of the on-device ML model, is stored remotely at a remote system (e.g., a cluster of servers). The client device, using the on-device ML model, can process user data detected at the client device to generate predicted output, and can compare the predicted output to ground truth output to generate a client gradient. Further, the client device can transmit the client gradient to the remote system. The remote system can utilize the client gradient, and optionally additional client gradients generated in a similar manner at additional client devices, to update weights of the global ML model. The remote system can transmit the global ML model, or updated weights of the global ML model, to the client device. The client device can then replace the on-device ML model with the global ML model, or replace the weights of the on-device ML model with the updated weights of the global ML model, thereby updating the on-device ML model.

Ephemeral learning of ML model(s) is another increasingly popular ML technique for updating ML model(s). In traditional ephemeral learning, the on-device ML model is also stored locally on a client device of a user, and the global ML model is also stored remotely at the remote system. However, and in contrast with traditional federated learning, in traditional ephemeral learning there is a temporal component. For instance, the user data may be transmitted to the remote system to cause certain fulfillment to be performed. While the user data is being processed by the remote system to cause the certain fulfillment to be performed, the remote system, using the global ML model, can also process the user data received from the client device to generate predicted output, and can generate a remote gradient based on at least the predicted output (e.g., using self-supervised or unsupervised learning techniques), and discard the user data without ever storing the user data in non-transient storage of the remote system. This enables the remote system to update the global ML model based on the remote gradient while the user data received is temporarily available at the remote system and in a privacy-sensitive manner. Also, for instance, the user data may be processed locally at the client device to generate the client gradient in the same or similar manner described above with respect to federated learning, but transmit the client gradient to the remote system such that it is only available for utilization in updating the global ML model in an ephemeral manner.

However, scenarios for utilizing these different ML techniques for updating ML model(s) are generally limited to updating ML model(s) based on explicit user inputs provided by users at their respective client devices. As a result, updating ML model(s) using these ML techniques may take a long time. Moreover, the user data utilized in these different ML techniques is generally limited to a small subset of spoken utterances and/or commands provided by the users for which these ML model(s) are utilized (e.g., "Assistant, set an alarm for 6:00 AM") and only for languages for which the ML model(s) are commonplace or well-defined (e.g., English, Spanish, etc.), but not tail languages. As a result, updating ML model(s) using these ML techniques may simply reinforce the ML model(s) to process and/or understand well-known spoken utterances and/or commands in well-known languages. Accordingly, there is a need in the art to expand the practicality of using these different ML techniques beyond explicit user inputs and to broaden the diversity of data utilized by these different ML techniques.

SUMMARY

Implementations described herein are directed to utilizing various privacy-sensitive machine learning (ML) techniques for updating a global ML model based on processing audio data from radio stations across the world. In some implementations, a client device may receive, from a given radio station, a stream of audio data that captures a stream of spoken utterances in a given language. The client device may process, using an on-device ML model that is stored in on-device storage of the client device and that is an on-device counterpart of the global ML model, the stream of audio data, and may generate, using an unsupervised or semi-supervised learning technique and based on processing the stream of audio data using the on-device ML model, a client gradient. In some versions of those implementations, and according to an ephemeral learning ML technique for updating the global ML model, the client device may synchronously transmit the client gradient to a remote system (e.g., a high performance server or cluster of high performance servers) to cause the remote system to update the global ML model based on the client gradient and with respect to the given language, and optionally additional client gradients generated by additional client devices in the same or similar manner. In additional or alternative versions of those implementations, and according to a federated learning ML technique for updating the global ML model, the client device may asynchronously transmit the client gradient to the remote system to cause the remote system to update the global ML model based on the client gradient and with respect to the given language, and optionally additional client gradients generated by additional client devices in the same or similar manner. In additional or alternative implementation, the client device (or another computing device) may transmit the stream of audio data directly to the remote system. The remote system may process, using the global ML model, the stream of audio data, and may generate, using an unsupervised or semi-supervised learning technique and based on processing the stream of audio data using the global ML model, a remote gradient. In these implementations, the remote system may update the global ML model based on the remote gradient and with respect to the given language, and optionally other remote gradients generated by the remote system in the same or similar manner.

Accordingly, techniques described herein may utilize a combination of ephemeral learning techniques and federated learning techniques to update the global ML model based on streams of audio data from different radio stations that broadcast streams of audio data in different languages to expand the practicality of using these different ML techniques beyond explicit user inputs and to broaden the diversity of data utilized by these different ML techniques.

For example, assume that a given user of a given client device is located in South Africa—a country located on the African continent that recognizes 11 official languages with many diverse dialects. Further assume that, of these 11 official languages of South Africa, English is the only language for which a global multilingual ASR ML model is trained to recognize among, among these 11 official languages of South Africa, even though English is not the most common language spoken in South Africa. As a result, the global multilingual ASR model in this example may not be useful to a majority of the population of South Africa. While publicly available audio and/or video data repositories may include streams of audio data that capture the other 10 official languages of South Africa (and other unofficial languages of South Africa), these streams of audio data for the other 10 languages (and other unofficial languages) may be insufficient for training the global multilingual ASR model due to a very limited quantity of these streams of audio data since a majority of the other 10 languages (and other languages) may be considered tail languages that are not popular in other regions of the world and/or that are only utilized by a very small population of persons in the world, such as languages of indigenous tribes of South Africa that that utilize click consonants. However, further assume that there are hundreds of radio stations in South Africa that broadcast streams of audio data in all of these different languages of South Africa. Accordingly, by using the combination of ephemeral learning techniques and federated learning techniques described herein to update the global multilingual ASR ML model based on the streams of audio data from these hundreds of radio stations in all these different languages, the global multilingual ASR ML model may be trained to recognize all of these languages.

Although the above example is described with respect to the global ML model being a global multilingual ASR model, it should be understood that is for the sake of example and is not meant to be limiting. Rather, it should be understood that the techniques described herein may be utilized in updating any global ML model that processes audio data (also referred to herein as "audio-based ML model(s)"), features generated based on processing audio data, and/or that generates synthesized audio data. For instance, techniques described herein may be utilized to update a global language representation ML model that extracts features from the audio data to generate a rich feature representation of spoken utterances captured in the audio data, a global voice activity detection ML model that detects voice activity in the audio data, a global language identification ML model that detects a given language being spoken in the audio data, a global natural language understanding (NLU) ML model that processes features generated based on processing the audio data to parse the audio data, a global text-to-speech (TTS) ML model that generates synthesized speech audio data in a given language, and/or any other global ML model described herein.

In various implementations, the client device may determine whether to implement the ephemeral learning technique or the federated learning techniques to generate the client gradient for updating the global ML model with respect to the given language. In some versions of these implementations, the client device may make this determination based on a connection status between the client device and the remote system. For instance, in response to determining that the connection status indicates that there is a strong or stable connection between the client device and the remote system (e.g., via a Wi-Fi network, a cellular network, etc.), the client device may implement the ephemeral learning technique to generate the client gradient locally at the client device and transmit the client gradient to the remote system in a synchronous manner. Additionally, or alternatively, the client device may transmit the stream of audio data directly to the remote system in a synchronous manner to cause the remote system to generate the remote gradient. In these instances, the stream of audio data may be discarded by the client device subsequent to generating the client gradient and/or discarded by the remote system subsequent to generating the remote gradient such that the stream of audio data is not stored in non-transient memory of the client device or the remote system. In contrast, in response to determining that the connection status indicates that there is a weak or unstable connection between the client device and the remote system, the client device may implement the federated learning technique to generate the client gradient locally at the client device and transmit the client gradient to the remote system in an asynchronous manner when the client device subsequently establishes a strong or stable connection with the remote system.

In additional or alternative versions of those implementations, the client device may make this determination based on a current location of the client device (e.g., determined using a GPS sensor of the client device). For instance, in response to determining that the current location of the client device corresponds to a first location or first geographical region, the client device may implement the ephemeral learning technique to generate the client gradient locally at the client device and transmit the client gradient to the remote system in a synchronous manner. Additionally, or alternatively, the client device may transmit the stream of audio data directly to the remote system in a synchronous manner to cause the remote system to generate the remote gradient. In these instances, the stream of audio data may be discarded by the client device subsequent to generating the client gradient and/or discarded by the remote system subsequent to generating the remote gradient such that the stream of audio data is not stored in non-transient memory of the client device or the remote system. In contrast, in response to determining that the current location of the client device corresponds to a second location or second geographical region, then the client device may implement the federated learning technique to generate the client gradient locally at the client device and transmit the client gradient to the remote system in an asynchronous manner when the client device subsequently establishes a strong or stable connection with the remote system.

In various implementations, the client device and/or the remote system may utilize various language identification techniques to identify the given language of the stream of spoken utterances captured in the stream of audio data. In these implementations, the client device and/or the remote system may only implement the ephemeral learning technique and/or the federated learning technique in response to determining that the given language corresponds to a target language from among a plurality of target languages. Continuing with the above example where the given user of the given client device is located in South Africa, further assume that the stream of audio data captures a commercial from a given radio station in South Africa. The client device and/or the remote system may process, using a language identification ML model, the stream of audio data to identify the given language that is spoken during the commercial from the given radio station. In this example, and in response to determining that the given language that is spoken during the commercial from the given radio station corresponds to the English language, the client device and/or the remote system may refrain from implementing the ephemeral learning technique and/or the federated learning assuming that the English language is not one of the plurality of target languages (i.e., since the English language is not considered a tail language). In contrast, and in response to determining that the given language that is spoken during the commercial from the given radio station corresponds to the Swazi language, the client device and/or the remote system may implement the ephemeral learning technique and/or the federated learning assuming that the Swazi language is one of the plurality of target languages (i.e., since the Swazi language may be considered a tail language). Accordingly, the client device and/or the remote system may utilize various language identification techniques to determine which streams of audio data capture streams of spoken utterances in a given target language that is of interest in generating client gradients and/or remote gradients for updating the global ML model with respect to the given target language.

In various implementations, the client device and/or the remote system may utilize various deduplication techniques to determine whether the stream of audio data has been previously utilized in generating a client gradient and/or a remote gradient for updating the global ML model with respect to the given language based on audio-fingerprints. In these implementations, the client device and/or the remote system may only implement the ephemeral learning technique and/or the federated learning technique in response to determining that the stream of audio data has not been previously utilized in generating a client gradient and/or a remote gradient for updating the global ML model. For instance, the client device and/or the remote system may process, using an encoder-decoder ML model or another ML model, the stream of audio data to generate an embedding (or other lower dimensional representation of the audio data) as the audio-fingerprint for the stream of audio data. The embedding may be mapped to an embedding space (or another lower dimensional latent space) that enables the embedding to be compared to a plurality of previously generated embeddings for previously encountered streams of audio data. In these instances, if the embedding generated based on the stream of audio data matches a given previously generated embedding for a given previously encountered stream of audio data, then the stream of audio data may be discarded without implementing the ephemeral learning technique and/or the federated learning technique. In these instances, if the embedding and the given previously generated embedding are within a threshold distance in the embedding space (e.g., using Euclidean distance, cosine similarity, and/or another distance measure), then the stream of audio data may be discarded without implementing the ephemeral learning technique and/or the federated learning technique. Otherwise, the client device and/or the remote system may implement the ephemeral learning technique and/or the federated learning technique to generate a client gradient and/or a remote gradient based on the stream of audio data.

Also, for instance, the client device and/or the remote system may process, using local sensitivity hash, the stream of audio data to generate an audio hash as the audio-fingerprint for the stream of audio data. In these instances, if the audio hash generated based on the stream of audio data matches a given previously generated audio hash for a given previously encountered stream of audio data (e.g., based on determining that the audio hash and the given previously generated audio hash match), then the stream of audio data may be discarded without implementing the ephemeral learning technique and/or the federated learning technique. Otherwise, the client device and/or the remote system may implement the ephemeral learning technique and/or the federated learning technique to generate a client gradient and/or a remote gradient based on the stream of audio data.

In these implementations, the client device (and other client devices) may transmit the audio-fingerprints to the remote system to enable the remote system to generate a database of audio-fingerprints. The database of audio-fingerprints may be distributed from the remote system and to the client device (and the other client devices) to enable the client device (and the other client devices) to employ these deduplication techniques. Accordingly, as a population of client devices generates these audio-fingerprints, the remote system may maintain the database and periodically distribute the database of audio-fingerprints to ensure that the population of client devices refrains from performing duplicate and/or undesired processing on particular streams of audio data that are encountered multiple times.

Continuing with the above example where the given user of the given client device is located in South Africa, again assume that the stream of audio data captures a commercial from a given radio station in South Africa. Further assume that the commercial from the given radio station in South Africa is played every hour for a period of one week. By using the deduplication techniques described herein, the client device and/or the remote system ensure that client gradients and/or remote gradients are not generated based on the stream of audio data capturing the commercial each hour that it is played over the one week period. Accordingly, not only do these deduplication techniques conserve computational and/or network resources by refraining from implementing the ephemeral learning technique and/or the federated learning technique each instance that the commercial is encountered, but these deduplication techniques also ensure that the global ML model is not overfit to the commercial, thereby resulting in a more robust global ML model in terms of accuracy and/or precision. Rather, these deduplication techniques enable the client device and/or the remote system to limit a quantity of instances that the global ML model is updated based on client gradients and/or remote gradients that are generated based on multiple streams of audio data that capture the same stream of spoken utterances.

In various implementations, the client device and/or the remote system may utilize an unsupervised or self-supervised learning technique at least in part due to the lack of supervision signals for streams of audio data from the radio stations. In some versions of those implementations, one non-limiting example of an unsupervised or self-supervised learning technique that may be utilized to generate the client gradients and/or the remote gradients corresponds to a teacher-student technique. For instance, the client device and/or the remote system may process the stream of audio data to generate predicted output(s) (e.g., using the on-device ML model and/or the global ML, respectively). Further, the predicted output(s) may be compared to corresponding benchmark output(s) that are generated based on benchmark ML model(s) also being utilized to process the stream of audio data. In this instance, the benchmark ML model(s) may be of a same type as the on-device ML model utilized by the client device and the global ML model utilized by the remote system, and the benchmark output(s) may be utilized as a quasi-supervision signal for generating the client gradient and/or the remote gradient, respectively. In instances where the client device implements the ephemeral learning technique to generate the client gradient based on processing using the on-device ML model, the benchmark ML model(s) may correspond to the on-device ML model, the global ML model, or a separate dedicated benchmark ML model. In instances where the client device implements the federated learning technique to generate the client gradient based on processing using the on-device ML model, the benchmark ML model(s) may correspond to the on-device ML model or a separate dedicated benchmark ML model. In instances where the remote system implements the ephemeral learning technique to generate the remote gradient based on processing using the global ML model, the benchmark ML model(s) may correspond to the on-device ML model, the global ML model, or a separate dedicated benchmark ML model.

In some further versions of those implementations, the predicted output(s) may only be utilized in generating a client gradient and/or a remote gradient for updating the global ML model in response to determining that one or more conditions are satisfied. The one or more conditions can include, for example, whether the predicted output(s) satisfy a predicted output threshold, whether the benchmark output(s) satisfy a benchmark output threshold, and/or other conditions. Put another way, the predicted output(s) may only be utilized in generating a client gradient and/or a remote gradient for updating the global ML model in response to determining that the benchmark output(s) provide a sufficient quasi-supervision signal for updating the global ML model.

In other versions of those implementations, one non-limiting example of an unsupervised or self-supervised learning technique that may be utilized to generate the client gradients and/or the remote gradients corresponds to a masking technique. For instance, a target portion of the stream of audio data may be identified. The target portion of the stream of audio data may be subsequent to a prepended portion of the stream of audio data and may be prior to an appended portion of the stream of audio data. Further, the target portion of the stream of audio data may be masked using various techniques. The target portion of the stream of audio data may be selected arbitrarily, or selected based on one or more criteria such as a particular segment between n and m seconds of audio data corresponding to the target portion and/or any other criteria for selecting the target portion of the client data. In this instance, the target portion of the stream of audio data may correspond to a target audio waveform portion of the stream of audio data, the prepended portion of the stream of audio data may correspond to a prepended audio waveform portion that is received prior to the target audio waveform portion, and the appended portion of the stream of audio data may correspond to an appended audio waveform portion that is received subsequent to the target audio waveform portion.

In those implementations, the prepended portion of the stream of audio data and the appended portion of the stream of audio data may be processed using the on-device ML model and/or the global ML model to generate predicted output(s) that predict the target portion of the stream of audio data. For instance, in implementations where the target portion of the client data corresponds to the target audio waveform portion of the stream of audio data, the prepended audio waveform portion and the appended audio waveform portion may be processed using the on-device ML model and/or the global ML model to generate a predicted target audio waveform that is predicted to correspond to the target audio waveform portion. Further, the predicted target audio waveform may be compared to the target audio waveform that was masked to generate the client gradient and/or the remote gradient. Accordingly, the on-device ML model may attempt to reconstruct the target audio waveform portion based on processing the prepended audio waveform portion and the appended audio waveform portion. Notably, this technique may be particularly advantageous when the on-device ML model and the global ML model corresponds to a multilingual ASR model since a language may be irrelevant to reconstructing the target audio waveform portion.

In various implementations that implement the ephemeral learning technique, and prior to processing the stream of audio data, the stream of audio data may be routed through buffer(s) (e.g., buffer(s) of the client device and/or buffer(s) of the remote system). In some versions of those implementations, the buffer(s) can be utilized to tag the stream of audio data with various tags that are based on the given language (e.g., determined using the language identification techniques described herein) of the stream of spoken utterances that are included in the stream of audio data, based on whether the stream of audio data includes a stream of spoken utterances on which the global ML model was previously updated (e.g., determined using the deduplication techniques described herein), based on a name associated with the radio station (e.g., a name of an Internet radio station), based on an amplitude modulation (AM) radio band associated with the stream of audio data, based on a frequency modulation (FM) radio band associated with the stream of audio data, based on a current location of the client device when the stream of audio data was received, and/or based on a geographical region of the client device when the stream of audio data was received. In these implementations, if the client device and/or the remote system determine that the stream of audio data should not be processed, such as when the stream of audio data captures a stream of spoken utterances in a language that is not of interest, when the stream of audio data captures a stream of spoken utterance that were previously utilized in generating gradients, and/or in other cases, then the stream of audio data may be discarded from the buffer(s) and the client device and/or the remote system may refrain from performing any additional processing on the stream of audio data.

As described herein, various architectures may be utilized to enable the client device and/or the remote system to receive the stream of audio data. In some implementations, the stream of audio data may be generated by an Internet radio station. In some versions of those implementations, the stream of audio data may be received at the client device and over one or more networks (e.g., the Internet), and may be processed locally at the client device using the ephemeral learning technique and/or the federated learning technique to generate the client gradient that is transmitted to the remote system. In additional or alternative versions of those implementations, the stream of audio data may be received at the client device and over one or more networks (e.g., the Internet) and/or another computing device in communication with the remote system (e.g., one or more other servers), and may be transmitted to the remote system to cause the remote system to generate the remote gradient. In additional or alternative implementations, the stream of audio data may be generated by an AM or FM radio station. In some versions of those implementations, the stream of audio data may be received at the client device via an internal transceiver of the client device and/or via an external transceiver of the client device (e.g., an external transceiver that may be connected to the client device via a mini-jack of the client device or over one or more networks (e.g., Bluetooth)). In these implementations, the client device may sweep an AM radio band and/or FM radio band to receive the stream of audio data or be tuned to a particular AM radio band and/or FM radio band. The client device and/or the remote system may implement the ephemeral learning technique and/or the federated learning technique in the same or similar manner described above to generate the client gradient and/or the remote gradient.

In various implementations, and subsequent to updating the global ML model based on at least the client gradient and/or the remote gradient, the remote system may cause the updated global ML model (or updated global weights of the global ML model) to be distributed to the client device and/or additional client devices. In response to receiving the updated global ML model (or the updated global weights of the global ML model), the client device and/or the additional client devices can replace the on-device ML model with the updated global ML model (or replace on-device weights of the on-device ML model with the updated global weights of the global ML model) in the on-device storage. In some versions of those implementations, the remote system may only cause the updated global ML model (or updated global weights of the global ML model) to be distributed to the client device and/or the additional client devices in response to determining that one or more conditions are satisfied. The one or more conditions may include, for example, whether a current time at a current location of the client device corresponds to a particular time of day, whether a current day of week at the current location of the client device corresponds to a particular day of week, whether the global ML model has been updated based on a threshold quantity of gradients, whether performance of the updated global ML model satisfies a performance threshold, and/or other criteria.

By using techniques described herein, one or more technological advantages may be achieved. As one non-limiting example, techniques described herein enable global ML models to be updated based on processing streams of audio data that are available via radio stations that broadcast the streams of audio data in different languages. By enabling the global ML models to be updated based on processing streams of audio data that are available via radio stations, the global ML models are able to be updated based on diverse streams of audio data in diverse languages that may not otherwise be available. As a result, the global ML models may be more robust (e.g., in terms of precision and/or recall) and may be provided to more diverse groups of users. For instance, the language identification techniques described herein enable the global ML models to be updated with respect to specific tail languages that are not well-defined or well known to a majority of users. Also, for instance, the deduplication techniques described herein enable the global ML models to be updated with respect to diverse streams of audio data for these specific tail languages that are not well-defined or well known to the majority of users.

The above description is provided as an overview of only some implementations disclosed herein. Those implementations, and other implementations, are described in additional detail herein.

DETAILED DESCRIPTION

Figure 1A:
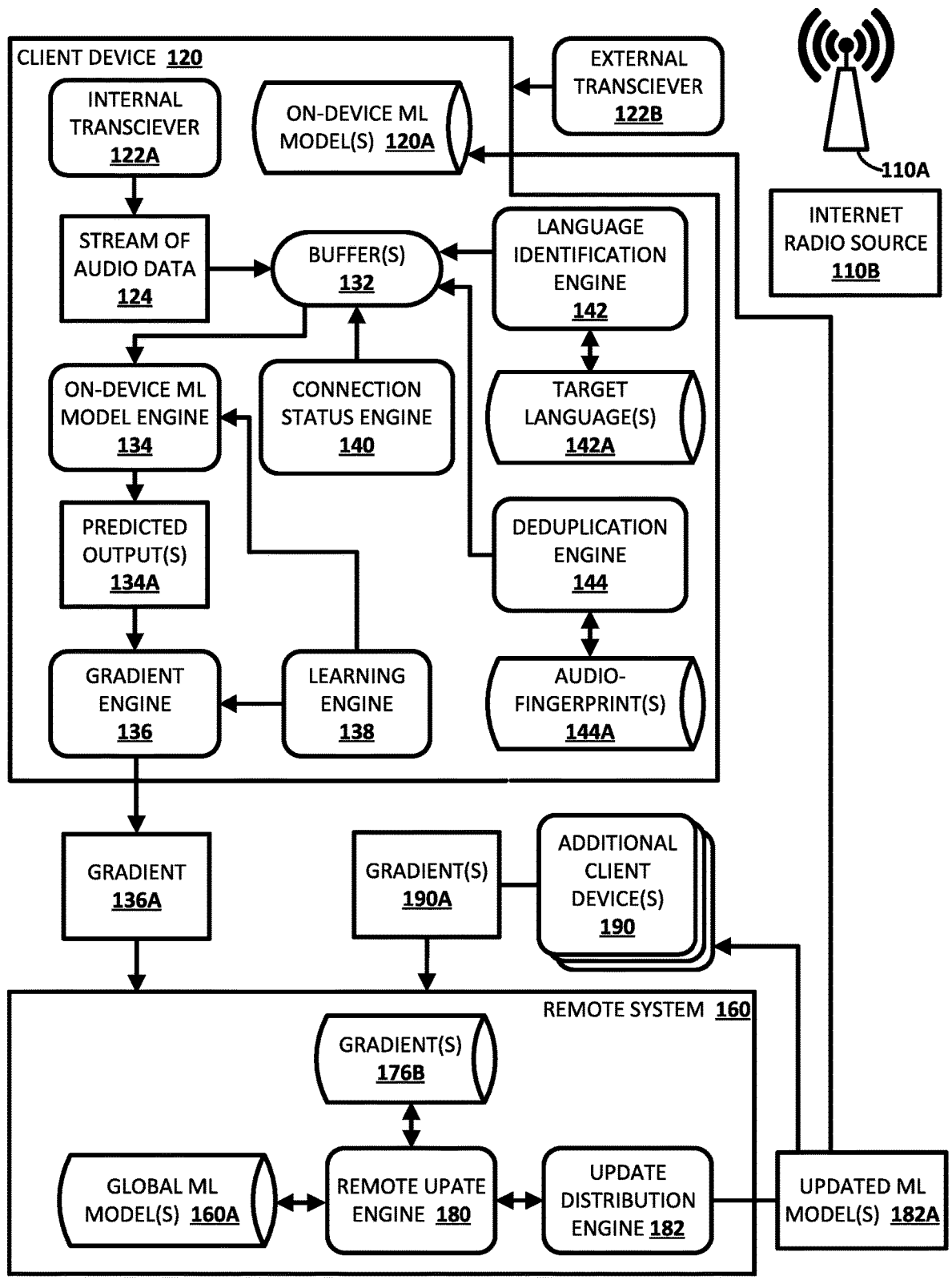
FIG. 1A and FIG. 1B depict example process flows that demonstrate various aspects of the present disclosure that may be implemented by a client device and a remote system, and in which implementations disclosed herein can be implemented.
Figure 1B:
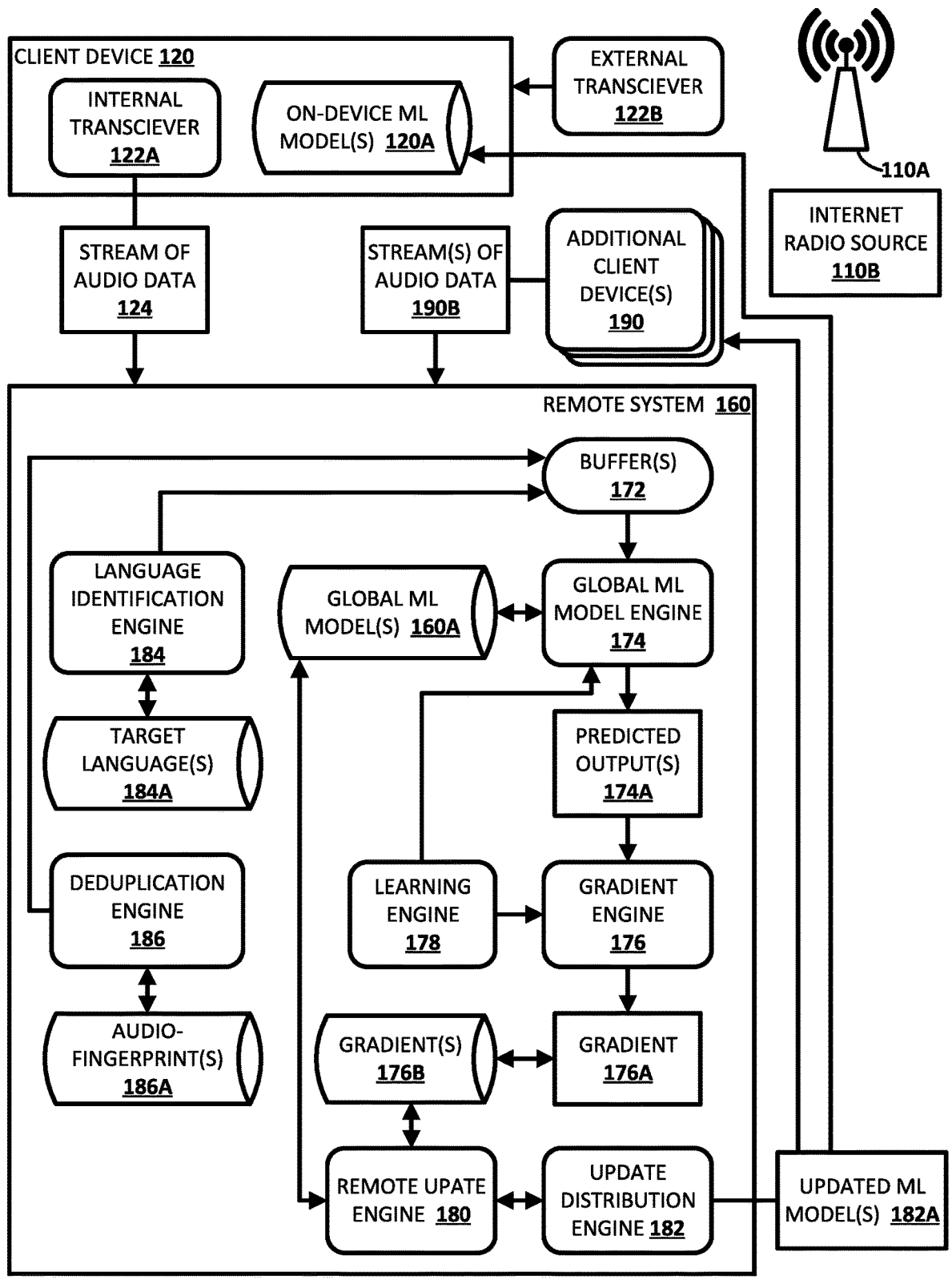

Turning now to FIGS. 1A and 1B, example process flows that demonstrate various aspects of the present disclosure that may be implemented by a client device 120 and a remote system 160 are depicted. The client device 120 illustrated in FIGS. 1A and 1B may include at least the components that are encompassed within the boxes of FIGS. 1A and 1B that represent the client device 120. Similarly, the remote system 150 illustrated in FIGS. 1A and 1B may include at least the components that are encompassed within the boxes of FIGS. 1A and 1B that represent the remote system 150. As described herein, the process flows of FIGS. 1A and 1B may be utilized to implement ephemeral learning and/or federated learning of audio-based machine learning (ML) model(s) based on streams of audio data generated via radio stations across the world.

Referring specifically to FIG. 1A, assume that a stream of audio data 124 is received at the client device 120. The stream of audio data 124 may be received via an internal transceiver 122A of the client device 120 (e.g., that is integral to the client device 120) or an external transceiver 122B that is coupled to the client device (e.g., via an audio jack of the client device 120 or by other means). Further, the stream of audio data 124 may be generated various sources, such as a radio station that emits the stream of audio data via a radio tower 110A and at different frequencies (e.g., an amplitude modulation (AM) frequency, a frequency modulation (FM) frequency, etc.), an internet radio source 110B, and/or other sources of radio. In some implementations, the client device 120 may cause the stream of audio data 124 to be buffered (e.g., in one or more buffers 132) while the stream of audio data 124 is initially processed by the client device 120 to determine whether to implement an ephemeral learning technique and/or federated learning technique on the stream of audio data 124, and/or where to implement the ephemeral learning technique and/or the federated learning technique (e.g., locally at the client device 120 as shown in the process flow of FIG. 1A or at the remote system 160 as shown in FIG. 1B).

As shown in FIG. 1A, the client device 120 may include various engines to perform various operations. For example, the client device 120 may include an on-device ML model engine 134, a learning engine 136, a gradient engine 138, a connection status engine 140, a language identification engine 142, and a deduplication engine 144. Further, the remote system may include a remote update engine 180 and an update distribution engine 182. Although the client device 120 and the remote system 160 are depicted in FIG. 1A as including particular engines that perform the process flow in a particular manner, it should be understood that is to illustrate various techniques described herein and is not meant to be limiting. For instance, various engines depicted in FIG. 1A may be combined and other engines may be added or omitted, and the process flow described with respect to FIG. 1A may be reordered (e.g., as described with respect to FIG. 1B).

Generally, the on-device ML model engine 134 may process, using an on-device audio-based ML model that is stored in on-device memory or storage of the client device 120 (e.g., stored in on-device ML model(s) database 120A) and that is an on-device counterpart of a global audio-based ML model to be updated (e.g., stored in global ML model(s) database 160A) the stream of audio data 124 to generate one or more predicted outputs 134A. The one or more predicted outputs 134A generated by the on-device audio-based ML model engine 134 may be based on a type of the on-device audio-based ML model that is utilized in processing the stream of audio data 124 (and the type of the global audio-based ML model that is to be updated based on the processing of the stream of audio data 124). For instance, assume that the on-device audio-based ML model and the global audio-based ML model are corresponding language representation ML models. In this example, the one or more predicted outputs 134A may include, for instance, a rich feature representation of the stream of audio data 124, such as a description of one or more sounds captured in the stream of audio data 124, a relationship between sounds captured in the stream of audio data 124, and/or other features of the stream of audio data 124. In contrast, assume that the on-device audio-based ML model and the global audio-based ML model are corresponding multilingual automatic speech recognition (ASR) models. In this example, the one or more predicted outputs 134A may include, for instance, recognized text in the given language, such as one or more terms corresponding to the stream of spoken utterances captured in the stream of audio data 124. Although the above examples are described with respect to particular audio-based ML models, it should be understood that is for the sake of example and is not meant to be limiting, and that other non-limiting examples of audio-based ML models are described with respect to FIG. 2.

Further, the gradient engine 136 may generate a gradient 136A based on the processing of the stream of audio data 124 by the on-device ML model engine 134 and/or the one or more predicted output 134A generated by the on-device ML model engine 134. The gradient 136A may be transmitted to the remote system 160 for utilization in updating the global audio-based ML model that is a global counterpart of the on-device audio-based ML model utilized in processing the stream of audio data 124. In generating the gradient 136A, the gradient engine 136 may utilize the learning engine 138. In some implementations, the learning engine 138 may employ one or more supervised learning techniques, whereas in other implementations the learning engine 138 may employ one or more unsupervised or semi-supervised learning techniques. However, in various implementations, and by virtue of the stream of audio data 124 being generated by a given radio station, an explicit supervision signal to employ one or more of the supervised learning techniques may not be available. Accordingly, techniques described herein are generally described with respect to one or more of the unsupervised or semi-supervised learning techniques although one or more of the supervised learning techniques may additionally, or alternatively, be utilized by the learning engine 138.

In some versions of those implementations, one or more of the unsupervised or semi-supervised learning techniques may correspond to a teacher-student technique. In implementing the teacher-student technique, the learning engine 138 may process, using one or more corresponding benchmark audio-based ML models, the stream of audio data 124 to generate one or more benchmark outputs. In these implementations, the one or more corresponding benchmark audio-based ML models may be the same ML model as the on-device audio-based ML model and/or the global audio-based ML model, or another audio-based ML model (e.g., stored in the on-device ML model(s) database 120A and/or the global ML model(s) database 160A) that is distinct from, but the same type as, the on-device audio-based ML model and the global audio-based ML model. Further, the one or more benchmark outputs may be utilized as a quasi-supervision signal to be utilized in generating the gradient 136A. For instance, the gradient engine 136 may compare the one or more predicted outputs 134A to the one or more benchmark output in generating the gradient 136A.

In some further versions of those implementations, the one or more benchmark outputs may only be utilized as the quasi-supervision signal in response to determining one or more conditions are satisfied. The one or more conditions can include, for example, whether one or more of the predicted outputs 134A satisfy a predicted output threshold, one or more of the benchmark outputs satisfy a benchmark output threshold, and/or other conditions. Put another way, the one or more benchmark outputs may only be utilized as the quasi-supervision signal in response to determining that the one or more benchmark outputs provide a viable supervision signal for the one or more predicted outputs 134A.

For example, again assume that the on-device audio-based ML model and the global audio-based ML model are corresponding multilingual automatic speech recognition (ASR) models. In this example, the on-device ML engine 134 can process, using the on-device multilingual ASR model, the stream of audio data 124 to generate recognized text in the given language as the one or more predicted outputs 134A. Further, the learning engine 138 can process, using a benchmark multilingual ASR model, the stream of audio data 124 to generate benchmark recognized text as the one or more benchmark outputs. In this example, and assuming the one or more conditions are satisfied, the gradient engine 136 can compare the recognized text and the benchmark recognized text in generating the gradient 136A.

In additional or alternative versions of those implementations, one or more of the unsupervised or semi-supervised learning techniques may correspond to a masking technique. In implementing the masking technique, the learning engine 138 may identify a target portion of the stream of audio data 124 that is less than all of the audio data included in the stream of audio data 124. Accordingly, the target portion of the stream of audio data 124 may be proximate to a prepended portion of the stream of audio data 124 that precedes the target portion of the stream of audio data 124 and/or an appended portion of the stream of audio data 124 that follows the target portion of the stream of audio data 124. The target portion of the stream of audio data 124 may be selected arbitrarily, or selected based on one or more criteria such as a particular segment between n and m seconds of the stream of audio data 124 being identified as the target portion and/or any other criteria for selecting the target portion of the stream of audio data 124. Further, the learning engine 138 may mask the target portion of the stream of audio data 124. Accordingly, the stream one or more predicted outputs 134A may include one or more predictions with respect to the masked target portion of the stream of audio data 124.

For example, again assume that the on-device audio-based ML model and the global audio-based ML model are corresponding language representation ML models. In this example, the target portion of the stream of audio data 124 may correspond to a target audio waveform portion of the stream of audio data 124, the prepended portion of the stream of audio data 124 may correspond to a prepended audio waveform portion that precedes the target audio waveform portion, and the appended portion of the stream of audio data 124 may correspond to an appended audio waveform portion that is subsequent to the target audio waveform portion. Further, the on-device ML engine 134 can process, using the on-device language representation ML model, the prepended audio waveform portion that precedes the target audio waveform portion and/or the appended audio waveform portion that is subsequent to the target audio waveform portion to generate the one or more predicted outputs 134A, such as a prediction of the target audio waveform portion. Notably, the prediction of the target audio waveform portion may include, for instance, a predicted audio waveform for the target audio waveform, one or more predicted features of the target audio waveform (e.g., a predicted amplitude, a predicted wavelength, a predicted phase, a predicted period, and/or other features), one or more predicted features of the stream of audio data 124 (e.g., predicted MFCCs, predicted melbank features, and/or other features), and/or other predicted representations of the target portion of the stream of audio data 124. Put another way, the on-device ML model engine 134 may attempt to reconstruct the target audio waveform portion based on processing the prepended audio waveform portion and/or the appended audio waveform portion. In this example, the gradient engine 136 can compare the predictions made with respect to the target portion of the stream of audio data 124 to actual features of the stream of audio data 124 in generating the gradient 136A.

Although particular unsupervised or semi-supervised learning techniques are described herein, it should be understood that those techniques are provided for the sake of example and are not meant to be limiting. Rather, it should be understood that any unsupervised or semi-supervised learning technique that may be utilized in generating gradients based on processing the stream of audio data 124 may be utilized and are contemplated herein.

In some implementations, the gradient 136A (and optionally one or more gradients 190A generated in the same or similar manner by one or more corresponding additional client devices 190 that each include the same or similar components and/or engines described with respect to the client device 120) may be generated in an ephemeral manner such that the stream of audio data 124 is not stored in transient memory or storage of the client device 120. In some versions of these implementations, the stream of audio data 124 may be discarded subsequent to generating the gradient 136A. Further, the gradient 136A may be transmitted to the remote system 160 in a synchronous manner (e.g., in response to the gradient 136A being generated). Put another way, the client device 120 may cause the stream of audio data 124 to be processed to generate the gradient 136A while it is temporarily available at the client device 120 (e.g., via the one or more buffers 132), and synchronously transmit the gradient 136A to the remote system 160 to reduce memory consumption at the client device 120 (hence the term "ephemeral learning" due to the ephemeral nature of this learning technique). In additional or alternative implementations, the client device 120 may update the on-device audio-based ML model that was utilized in generating the gradient 136A, and transmit one or more updated on-device weights of the updated on-device audio-based ML model to the remote system 160 in lieu of the gradient 136A.

In additional or alternative implementations, the gradient 136A (and optionally one or more gradients 190A generated in the same or similar manner by one or more corresponding additional client devices 190) may be generated in a federated manner such that the stream of audio data 124 may not be stored in transient memory or storage of the client device 120. In some versions of these implementations, the stream of audio data 124 may be discarded subsequent to generating the gradient 136A. However, the gradient 136A may be stored in memory or storage of the client device 120 and transmitted to the remote system 160 in an asynchronous manner (e.g., at a temporally distinct time that is subsequent to the gradient 136A being generated). Put another way, the client device 120 may cause the stream of audio data 124 to be processed to generate the gradient 136A, but wait to transmit the gradient 136A to the remote system 160.

In these implementations, the client device 120 may determine to implement ephemeral learning or federated learning based on, for example, a connection status of a connection (and optionally based on a connection strength of the connection) between the client device 120 and the remote system 160. For example, the connection status engine 140 may determine whether the client device 120 is connected to the remote system 160 (e.g., over one or more networks, such as one or more local area networks, one or more wide area networks, and/or one or more other networks) and/or a strength of the connection between the client device 120 and the remote system 160 (e.g., over one or more of the networks). The connection status engine 140 may make this determination while the stream of audio data 124 is transiently stored at the client device 120 (e.g., in one or more of the buffers 132). For instance, in response to the connection status engine 140 determining that the client device 120 and the remote system 160 have a strong and/or stable connection over one or more of networks, the client device 120 may implement ephemeral learning in generating and transmitting the gradient 136A to the remote system 160 since the connection status enables the gradient 136A to be synchronously transmitted to the remote system 160. In contrast, in response to the connection status engine 140 determining that the client device 120 and the remote system 160 have a weak and/or unstable connection over one or more of networks, the client device 120 may implement federated learning in generating and transmitting the gradient 136A to the remote system 160. These techniques are described in more detail herein (e.g., with respect to FIG. 7).

In some implementations, the client device 120 may only process the stream of audio data 124 to generate the gradient 136A in response to determining that the given language of the stream of spoken utterances captured in the stream of audio data 124 corresponds to a target language. For example, the language identification engine 142 may initially process, using one or more language identification models (e.g., stored in the on-device ML model(s) database 120A), the stream of audio data 124 to identify the given language. Further, the language identification engine 142 may determine whether the given language corresponds to a target language (e.g., stored in target language(s) database 142A). Notably, the target language may be one of a plurality of target languages, and may be defined, for example, by a developer to enable the global audio-based ML model to be updated with respect to target language. Put another way, certain languages (e.g., English, Spanish, French, German) may not be of interest since there is a plethora of data available for updating the global audio-based ML model with respect to these languages. Accordingly, these techniques enable the developer to target the specific target languages that are of interest (e.g., the Swazi language of South Africa) since there is little to no data for updating the global audio-based ML model with respect to these languages. These techniques are described in more detail herein (e.g., with respect to FIG. 5).

In some implementations, the client device 120 may only process the stream of audio data 124 to generate the gradient 136A in response to determining that the stream of audio data 124 has not been previously utilized in generating a gradient for updating the global audio-based ML model or has not has not been previously utilized more than a threshold quantity of instances in generating a gradient for updating the global audio-based ML model. For example, the deduplication engine 144 may initially process the stream of audio data 124 to generate an audio-fingerprint for the stream of audio data 124. Further, the deduplication engine 144 may determine whether the audio-fingerprint matches a previously generated audio-fingerprint (e.g., stored in audio-fingerprint(s) database 144A). Notably, the audio-fingerprint may correspond to an embedding, an audio hash, and/or any other representation of the stream of audio data 124 that enables the stream of audio data 124 to be compared to other streams of audio data. Put another way, the deduplication engine 144 may be utilized to ensure that the global audio-based ML model is not continuously updated based on the same stream of audio data (e.g., a commercial on the given radio station) to prevent overfitting of the global audio-based ML model to the same stream of audio data, and to ensure diversity of the underlying streams of audio data that are utilized in generating gradients. These techniques are described in more detail herein (e.g., with respect to FIG. 5).

In various implementations, and assuming that the gradient 136A is transmitted to the remote system 160 (e.g., in a synchronous or asynchronous manner) and assuming that the one or more gradients 190A generated in the same or similar manner by the one or more corresponding additional client devices 190, the remote system 160 may update the global audio-based ML model using a remote update engine 180 and subsequently distribute updated audio-based ML model(s) 182A to the client device 120 (and optionally one or more of the additional client devices 190) using an update distribution engine 182. In some versions of those implementations, the remote system 160 may update the global audio-based ML model in a streaming manner (e.g., as the gradient 136A and the one or more gradients 190A are received from the respective client devices). In additional or alternative versions of those implementations, the remote system 160 may store the gradient 136A and the one or more gradients 190A in one or more databases (e.g., gradient(s) database 176B), and may update the global audio-based ML model in response to determining that one or more conditions for updating the global audio-based ML model are satisfied. The one or more conditions for updating the global audio-based ML model may include, for example, a particular time of day, a particular day of week, whether a threshold quantity of gradients are available to update the global audio-based ML model, and/or other conditions.

In updating the global audio-based ML model, the remote system 160 may update one or more weights of the global audio-based ML model based on the gradient 136A and the one or more gradients 190A are received from the respective client devices. In some implementations, the remote update engine 180 can utilize a gradient descent algorithm to update one or more of the global weights. In some versions of those implementations, the remote update engine 180 may average the gradient 136A and the one or more gradients 190A that are received from the respective client devices prior to utilizing the gradient descent algorithm prior to updating one or more of the global weights. In additional or alternative versions of those implementations, the remote update engine 180 may utilize each of the gradient 136A and the one or more gradients 190A that are received from the respective client devices, or a subset thereof, to update one or more of the global weights using the gradient descent algorithm.

In distributing the updated audio-based ML model(s) 182A to the client device 120 (and optionally one or more of the additional client devices 190), the update distribution engine 182 may determine whether one or more conditions for the updated audio-based ML model(s) 182A (or one or more of the global weights thereof) are satisfied. The one or more conditions can be based on whether the client device 120 is ready to receive the client device 120, such as whether the client device 120 is charging, whether the client device 120 has at least a threshold state of charge, whether a temperature of the client device 120 (based on one or more corresponding on-device temperature sensors) is less than a threshold, whether the client device 120 is being held by a user, temporal condition(s) associated with the client device 120 (e.g., between a particular time period, every N hours, where N is a positive integer, and/or other temporal conditions), and/or other conditions. Further, the one or more conditions can additionally, or alternatively, be based on other conditions that are specific to the remote system 160, such as whether performance of the updated audio-based ML model(s) 182A satisfying a performance threshold, whether the updated audio-based ML model(s) 182A has updated based on a threshold quantity of gradients, and/or other conditions.

Accordingly, when the client device 120 (and optionally one or more of the additional client devices 190) receives the updated audio-based ML model(s) 182A (or one or more of the global weights thereof), the on-device audio-based ML model (or one or more of the on-device weights thereof) may be replaced with the updated audio-based ML model(s) 182A (or one or more of the global weights thereof). This process may be repeated to continue updating the global audio-based ML model. In some implementations, this process may be repeated to continue updating the global audio-based ML model until it is determined that the global audio-based ML model has converged.

Referring specifically to FIG. 1B, again assume that the stream of audio data 124 is received at the client device 120. However, in FIGS. 1B and 1n contrast with FIG. 1B, the ephemeral learning is performed by the remote system 160 and not locally at the client device 120 and/or one or more of the additional client devices 190. Put another way, in FIGS. 1B and 1n contrast with FIG. 1B, the client device 120 and/or one or more of the additional client devices 190 are utilized as a proxy for the remote system to obtain the stream of audio data 124 from the client device 120 and one or more streams of audio data 190B from a corresponding one of the additional client devices 190.

Notably, in FIG. 1B, the remote system 160 includes remote-based counterparts of many of the components and engines described with respect to FIG. 1A. For example, one or more buffers 172 of the remote system FIG. 1B may be utilized in the same or similar manner described above with respect to the one or more buffers 132 of the client device 120; global ML model engine 174 of the remote system 160 may be utilized to generate one or more predicted output 174A in the same or similar manner described with respect to the on-device ML model engine 134, but using the global audio-based ML model stored in the global ML model(s) database 160A; gradient engine 176 of the remote system 160 may be utilized to generate a gradient 176A at the remote system 160 in the same or similar manner described with respect to the gradient engine 136 of the client device; learning engine 178 of the remote system 160 may cause one or more supervised, unsupervised, or semi-supervised learning techniques to be utilized in generating the gradient 176A in the same or similar manner described with respect to the learning engine 138 of the client device 120; language identification engine 184 of the remote system 160 may be utilized in the same or similar manner described with respect to the language identification engine 142 of the client device 120, but utilize remote memory or storage (e.g., target language(s) database 184A) to determine whether the given language of the stream of spoken utterances captured in the stream of audio data 124 corresponds to a target language; and deduplication engine 186 of the remote system 160 may be utilized in the same or similar manner described with respect to the deduplication engine 144 of the client device, but utilize remote memory or storage (e.g., audio-fingerprint(s) database 186A) to determine whether the stream of audio data 124 has been previously utilized in updating the global audio-based ML model. However, it should be noted that the remote system 160 does not include a remote counterpart to the connection status engine 140 since this determination may be made exclusively at the client device 120. Accordingly, it should be understood that the ephemeral learning described herein may be performed locally at the client device 120, remotely from the client device 120 (e.g., at the remote system 160), or both.

Figure 2:
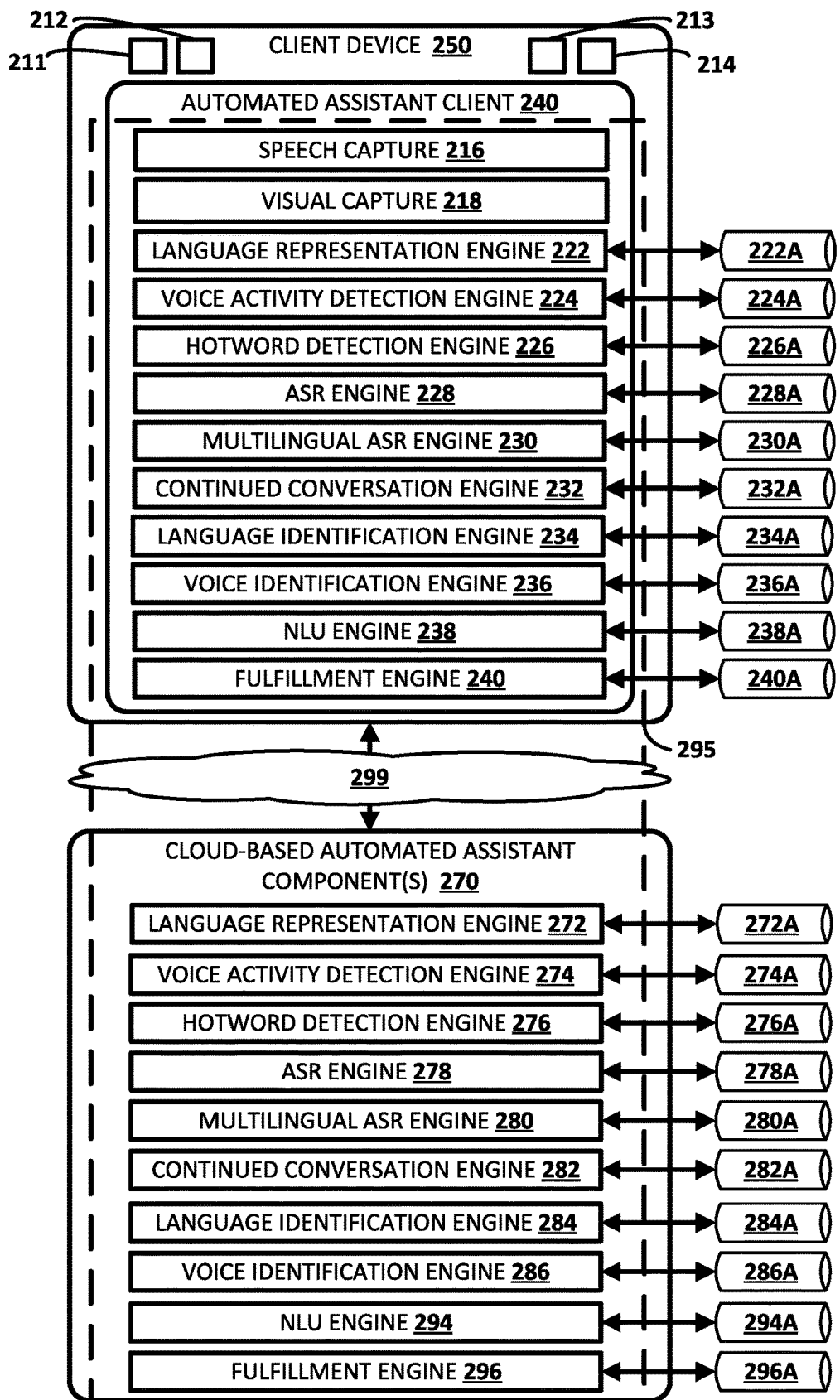
FIG. 2 depicts a block diagram of an example environment in which implementations disclosed herein may be implemented.

Turning now to FIG. 2, a client device 250 is illustrated in an implementation where various on-device ML engines are included as part of (or in communication with) an automated assistant client 240 is depicted. The respective ML models are also illustrated interfacing with the various on-device ML engines. Other components of the client device 250 are not illustrated in FIG. 2 for simplicity. FIG. 2 illustrates one example of how the various on-device ML engines of and their respective ML models can be utilized by the automated assistant client 240 in performing various actions.

The client device 250 in FIG. 2 is illustrated with one or more microphones 211, one or more speakers 212, one or more vision components 213, and display(s) 214 (e.g., a touch-sensitive display). The client device 250 may further include pressure sensor(s), proximity sensor(s), accelerometer(s), magnetometer(s), and/or other sensor(s) that are used to generate other sensor data that is in addition to audio data captured by the one or more microphones 211. The client device 250 at least selectively executes the automated assistant client 240. The automated assistant client 240 includes, in the example of FIG. 2, language representation engine 222, voice activity detection engine 224, hotword detection engine 226, ASR engine 228, multilingual ASR engine 230, continued conversation engine 232, language identification engine 234, and voice identification engine 236. The automated assistant client 240 further includes speech capture engine 216 and visual capture engine 218. It should be understood that the ML engines and ML models depicted in FIG. 2 are provided for the sake of example, and are not meant to be limiting. For example, the automated assistant client 240 can further include additional and/or alternative engines, such as a text-to-speech (TTS) engine and a respective TTS model, an endpoint detector engine and a respective endpoint detector model, and/or other engine(s) along with associated ML model(s). Moreover, it should be understood that one or more of the engines and/or models described herein can be combined, such that a single engine and/or model can perform the functions of multiple engines and/or models described herein.

One or more cloud-based automated assistant components 270 can optionally be implemented on one or more computing systems (collectively referred to as a "cloud" computing system) that are communicatively coupled to client device 250 via one or more networks as indicated generally by 299. The cloud-based automated assistant components 270 can be implemented, for example, via a cluster of high-performance servers. In various implementations, an instance of the automated assistant client 240, by way of its interactions with one or more of the cloud-based automated assistant components 270, may form what appears to be, from a user's perspective, a logical instance of an automated assistant as indicated generally by 295 with which the user may engage in a human-to-computer interactions (e.g., spoken interactions, gesture-based interactions, and/or touch-based interactions).

The client device 250 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client devices may be provided.

The one or more vision components 213 can take various forms, such as monographic cameras, stereographic cameras, a LIDAR component (or other laser-based component(s)), a radar component, etc. The one or more vision components 213 may be used, e.g., by the visual capture engine 218, to capture image data corresponding to vision frames (e.g., image frames, laser-based vision frames) of an environment in which the client device 250 is deployed. In some implementations, such vision frame(s) can be utilized to determine whether a user is present near the client device 250 and/or a distance of a given user of the client device 250 (e.g., the user's face) relative to the client device 250. Such determination(s) can be utilized, for example, in determining whether to activate the various on-device ML engines depicted in FIG. 2, and/or other engine(s). Further, the speech capture engine 218 can be configured to capture a user's spoken utterance(s) and/or other audio data captured via the one or more of the microphones 211.

As described herein, streams of audio data can be processed by the various engines depicted in FIG. 2 to make predictions at the client device 250 using corresponding ML models and/or at one or more of the cloud-based automated assistant components 270 using corresponding ML models updated in the manner described herein (e.g., with respect to FIGS. 1A, 1B, and 3-7).

As some non-limiting examples, the respective language representation engines 222, 272 can utilize respective language representation models 222A, 272A to generate a rich feature representation of a stream of audio data and/or a stream of spoken utterances captured in the stream of audio data; the respective voice activity detection engines 224, 274 can utilize respective voice activity detection models 224A, 274A to predict whether a stream of audio data includes voice activity of a user of the client device 250 and/or other users; the respective hotword detection engines 226, 276 can utilize respective language representation models 226A, 276A to predict whether a stream of audio data includes one or more particular words or phrases to invoke the automated assistant 295 (e.g., "Ok Assistant", "Hey Assistant", "What is the weather Assistant?", etc.) or certain functions of the automated assistant 295); the respective ASR engines 228, 278 can utilize a respective ASR model 228A, 278A to generate recognized text for a given language based on processing a stream of audio data, or predict phoneme(s) and/or token(s) that correspond to the stream of audio data detected at the client device 250 and generate the recognized text for the given language based on the phoneme(s) and/or token(s); the respective multilingual ASR engines 230, 280 can utilize a respective ASR model 230A, 280A to generate recognized text for a plurality of languages based on processing a stream of audio data, or predict phoneme(s) and/or token(s) that correspond to the stream of audio data detected at the client device 250 and generate the recognized text for the plurality of languages based on the phoneme(s) and/or token(s); the respective continued conversation engines 232, 282 can utilize a respective continued conversation model 232A, 282A to predict whether further streams of audio data is directed to the automated assistant 295 (e.g., or directed to an additional user in the environment of the client device 250); the respective language identification engines 234, 284 can utilize a respective language identification model 234A, 284A to predict a given language of a stream of spoken utterances captured in a stream of audio data; and the respective voice identification engines 236, 286 can utilize a respective voice identification model 236A, 286A to predict whether a stream of audio data captures a stream of spoken utterances of one or more users of the client device 250 (e.g., by generating a speaker embedding, or other representation, that can be compared to a corresponding actual embeddings for one or more of the user of the client device 250).

In some implementations, the client device 250 and one or more of the cloud-based automated assistant components 270 may further include natural language understanding (NLU) engines 238, 294 and fulfillment engine 240, 296, respectively. The NLU engines 238, 294 may perform natural language understanding, utilizing respective NLU models 238A, 294A, on recognized text, predicted phoneme(s), and/or predicted token(s) generated by, for instance, the ASR engines 228, 278 and/or the multilingual ASR engines 230, 280 to generate NLU data. The NLU data can include, for example, intent(s) that correspond to the spoken utterance and optionally slot value(s) for parameter(s) for the intent(s). Further, the client device 250 and one or more of the cloud-based automated assistant components 270 may further include fulfillment engines 240, 296, respectively. The fulfillment engines 240, 296 can generate fulfillment data utilizing respective fulfillment models or rules 240A, 296A, and based on processing the NLU data. This fulfillment data can define certain fulfillment that is responsive to user input (e.g., spoken utterances, typed input, touch input, gesture input, and/or any other type of user input) provided by a user of the client device 250. The certain fulfillment can include interaction(s) to perform with locally installed application(s) based on the user input, command(s) to transmit to Internet-of-things (IoT) device(s) (directly or via corresponding remote system(s)) based on the user input, and/or other resolution action(s) to perform based on the user input. The fulfillment data is then provided for local and/or remote performance/execution of the determined action(s) to cause the certain fulfillment of the user input to be performed. Execution can include, for example, rendering local and/or remote responses (e.g., visually and/or audibly rendering (optionally utilizing an on-device TTS module)), interacting with locally installed applications, transmitting command(s) to IoT device(s), and/or other action(s). In other implementations, the NLU engines 238, 294 and the fulfillment engines 240, 296 may be omitted, and the ASR engines 228, 278 and/or the multilingual ASR engines 230, 280 can generate the fulfillment data directly based on the user input. For example, assume the ASR engines 228, 278 and/or the multilingual ASR engines 230, 280 processes, using the respective models, a stream of audio data that captures a spoken utterance of "turn on the lights." In this example, the ASR engines 228, 278 and/or the multilingual ASR engines 230, 280 can generate a semantic output that is then transmitted to a software application associated with the lights and/or directly to the lights that indicates that they should be turned on.

Notably, the cloud-based automated assistant component(s) 270 include cloud-based counterparts to the engines and models described herein with respect to FIG. 2. However, in some implementations, these engines and models may not be utilized since the engines and models may be transmitted directly to the client device 250 and executed locally at the client device 250, whereas in other implementations, these engines and models may be utilized exclusively when the client device 250 detects any user input and transmits the user input to the cloud-based automated assistant component(s) 270. In various implementations, these engines and models executed at the client device 250 the cloud-based automated assistant component(s) 270 may be utilized in conjunction with one another in a distributed manner. Nonetheless, a remote execution module can optionally be included that performs remote execution based on local or remotely generated NLU data and/or fulfillment data. Additional and/or alternative remote engines can be included. As described herein, in various implementations on-device speech processing, on-device image processing, on-device NLU, on-device fulfillment, and/or on-device execution can be prioritized at least due to the latency and/or network usage reductions they provide when resolving a spoken utterance (due to no client-server roundtrip(s) being needed to resolve the spoken utterance). However, one or more cloud-based automated assistant component(s) 270 can be utilized at least selectively. For example, such component(s) can be utilized in parallel with on-device component(s) and output from such component(s) utilized when local component(s) fail. For example, if any of the on-device engines and/or models fail (e.g., due to relatively limited resources of client device 250), then the more robust resources of the cloud may be utilized.

Figure 3:
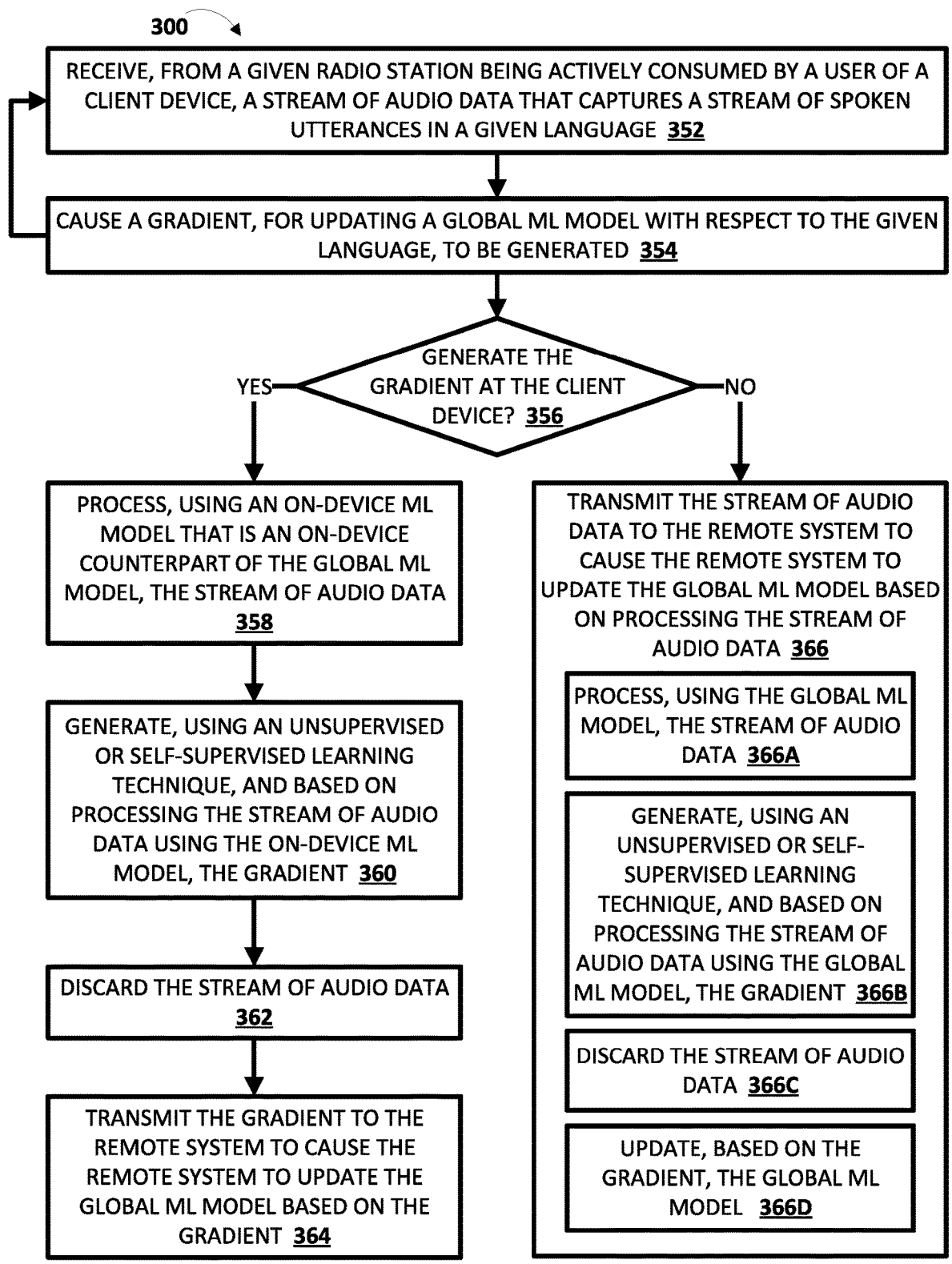
FIG. 3 depicts a flowchart illustrating an example method of ephemeral learning implemented by a client device and based on a stream of audio generated by a given radio station, in accordance with various implementations.

Turning now to FIG. 3, a flowchart illustrating an example method 300 of ephemeral learning implemented by a client device and based on a stream of audio generated by a given radio station is depicted. For convenience, the operations of the method 300 are described with reference to a system that performs the operations. The system of method 300 includes one or more processors and/or other component(s) of a client device (e.g., client device 120 of FIGS. 1A and 1B, client device 250 of FIG. 2, computing device 810 of FIG. 8, and/or other client devices). Moreover, while operations of the method 300 are shown in a particular order, this is not meant to be limiting. One or more operations may be reordered, omitted, or added.

At block 352, the system receives, from a given radio station being actively consumed by a user of a client device, a stream of audio data that captures a stream of spoken utterances in a given language. The stream of spoken utterances may capture, for instance, spoken utterances that include commercial or advertisement content from the given radio station, spoken utterances that include disc jockey content from the given radio station, spoken utterances that include podcast content from the given radio station, spoken utterance that include music content from the given radio station, and/or other sources of content from the given radio station. However, in some implementations, the system may discard any streams of audio data that capture spoken utterances that include music content from the given radio station. In some implementations, the stream of audio data may be of a fixed length (e.g., 5 seconds, 10 seconds, 15 seconds, etc.). In additional or alternative implementations, the stream of audio data may be of a dynamic length (e.g., a length of commercial or advertisement content, a length of disc jockey, a length of podcast content, etc.).

At block 354, the system causes a gradient, for updating a global machine learning (ML) model with respect to the given language, to be generated. The system may return to block 352 to block 352 to continue receiving additional streams of audio data that capture additional streams of spoken utterances from the given radio station that is being actively consumed by the user of the client device. This enables the system to perform multiple iterations of the method 300 of FIG. 3 in parallel as streams of audio data are received from the given radio station that is being actively consumed by the user of the client device. Notably, at block 354, the gradient is not yet generated. Rather, at block 354, the system may perform various operations to determine whether to generate the gradient based on the stream of audio data (e.g., audio-fingerprint operations as described with respect to FIG. 5, language identification operation as described with respect to FIG. 5, and/or other operations described herein).

At block 356, the system may determine whether to generate the gradient locally at the client device or remotely from the client device. In some implementations, the system may determine to generate the gradient locally at the client device by default. In other implementations, the system may determine to generate the gradient remotely from the client device by default. In yet other implementations, the system may determine to generate the gradient locally at the client device in some instances, but generate the gradient remotely from the client device in other instances. For example, the system may prioritize generating the gradient locally at the client device to reduce a quantity of network resources consumed in transmitting the stream of audio data to a remote system, but begin transmitting the stream of audio data to the remote system in response to determining that a threshold quantity of computational resources are being consumed at the client device. Also, for example, the system may periodically switch between causing the gradient to be generated locally at the client device and remotely from the client device to more evenly distribute the computational resources being consumed by the client device and the remote system. It should be understood that these examples are not meant to be limiting, and that any other criteria for determining whether to generate the gradient locally at the client device or remotely from the client device are contemplated herein.

If, at an iteration of block 356, the system determines to generate the gradient locally at the client device, then the system may proceed to block 358. At block 358, the system processes, using an on-device ML model that is an on-device counterpart of the global ML model and that is stored in on-device memory or storage of the client device, the stream of audio data. At block 360, the system generates, using an unsupervised or self-supervised learning technique, and based on processing the stream of audio data using the on-device ML model, the gradient. At block 362, the system discards the stream of audio data. At block 364, the system transmits the gradient to the remote system to cause the remote system to update the global ML model based on the gradient. Put another way, the system may cause the operations of the process flow described with respect to FIG. 1A to be performed locally at the client device.

If, at an iteration of block 356, the system determines to generate the gradient remotely from the client device, then the system may proceed to block 366. At block 366, the system transmits the stream of audio data to the remote system to cause the remote system to update the global ML model based on processing the stream of audio data. Put another way, rather than the system causing the gradient to be generated locally at the client device based on the stream of audio data being processed locally at the client device, the system may cause the stream of audio data to be transmitted to the remote system to enable the remote system to process the stream of audio data and generate the gradient based on the processing of the stream of audio data (e.g., as described with respect to FIG. 1B). In doing so, the system may cause the remote system to perform operations. For example, at block 366A, the system causes the remote system to process, using the global ML model, the stream of audio data. Further, at block 366B, the system causes the remote system to generate, using an unsupervised or self-supervised learning technique, and based on processing the stream of audio data, the gradient. Moreover, at block 366C, the system causes the remote system to discard the stream of audio data. Additionally, at block 366D, the system causes the remote system to update, based on the gradient, the global ML model.

Accordingly, the system may initially receive the stream of audio data at the client device and may determine whether to generate the gradient to be utilized in updating the global ML model locally at the client device or remotely from the client device. In making this determination, the system may consider computational resources that would be consumed at the client device in generating the gradient and/or network resources that would be consumed in transmitting the stream of audio data to the remote system to reduce consumption of the computational and/or network resources while still enabling the system to cause the global ML model to be updated based on diverse streams of audio data generated by radio stations across the world. As a result, the global ML models that are updated in this manner are more robust to processing and/or understanding more languages of users across the world.

Figure 4:
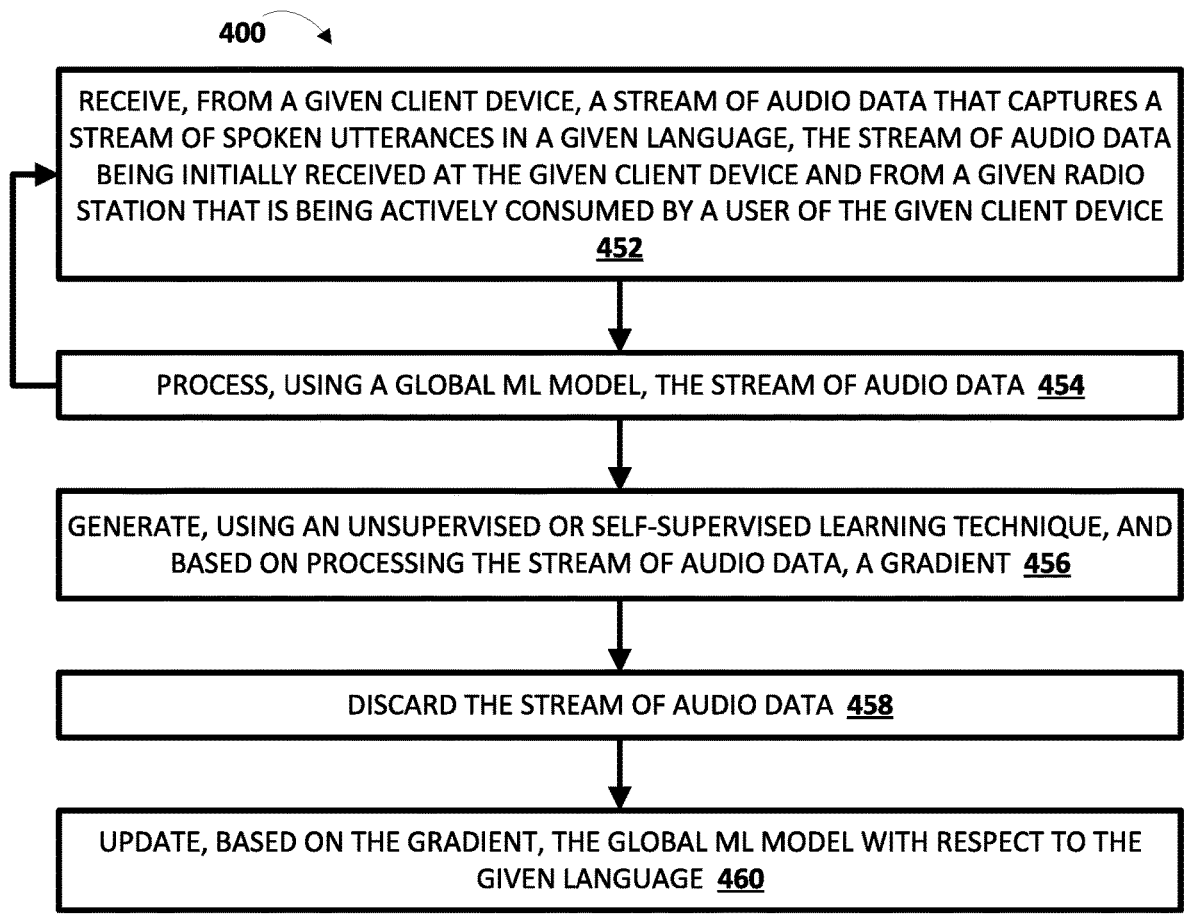
FIG. 4 depicts a flowchart illustrating an example method of ephemeral learning implemented by a remote system and based on a stream of audio generated by a given radio station, in accordance with various implementations.

Turning now to FIG. 4, a flowchart illustrating an example method 400 of ephemeral learning implemented by a remote system and based on a stream of audio generated by a given radio station is depicted. For convenience, the operations of the method 400 are described with reference to a system that performs the operations. The system of method 400 includes one or more processors and/or other component(s) of a remote system (e.g., remote system 160 of FIGS. 1A and 1B, cloud-based automated assistant component(s) 270 of FIG. 2, computing device 810 of FIG. 8, and/or other remote systems). Moreover, while operations of the method 400 are shown in a particular order, this is not meant to be limiting. One or more operations may be reordered, omitted, or added.

At block 452, the system receives, from a given client device, a stream of audio data that captures a stream of spoken utterances in a given language, the stream of audio data being initially received at the given client device and from a given radio station that is being actively consumed by a user of the given client device. At block 454, the system processes, using a global ML model, the stream of audio data. The system may return to block 452 to continue receiving additional streams of audio data. At block 456, the system generates, using an unsupervised or self-supervised learning technique, and based on processing the stream of audio data, a gradient. At block 458, the system discards the stream of audio data. At block 460, the system updates, based on the gradient, the global ML model with respect to the given language.

Put another way, in implementations according to the method 400 of FIG. 4, the system may utilize the given client device as a proxy for obtaining the stream of audio data. Further, the system may process the stream of audio data to generate a gradient for utilization in updating the global ML model (e.g., as described with respect to FIG. 1B). This enables ephemeral learning to not only be performed locally at client devices, but also at remote systems. In additional or alternative implementations, the system may obtain the stream of audio data directly from the given radio station to further reduce consumption of network resources.

Although the method 400 of FIG. 4 is described in a particular manner, it should be understood that is for the sake of example, and is not meant to be limiting. For example, the system may perform multiple iterations the method 400 of FIG. 4 in parallel and with respect to different streams of audio data that are received from the given client device and/or additional client devices. As another example, the system may initially process the stream of audio data to determine whether to generate the gradient for utilization in updating the global ML model (e.g., as described with respect to FIG. 6).

Figure 5:
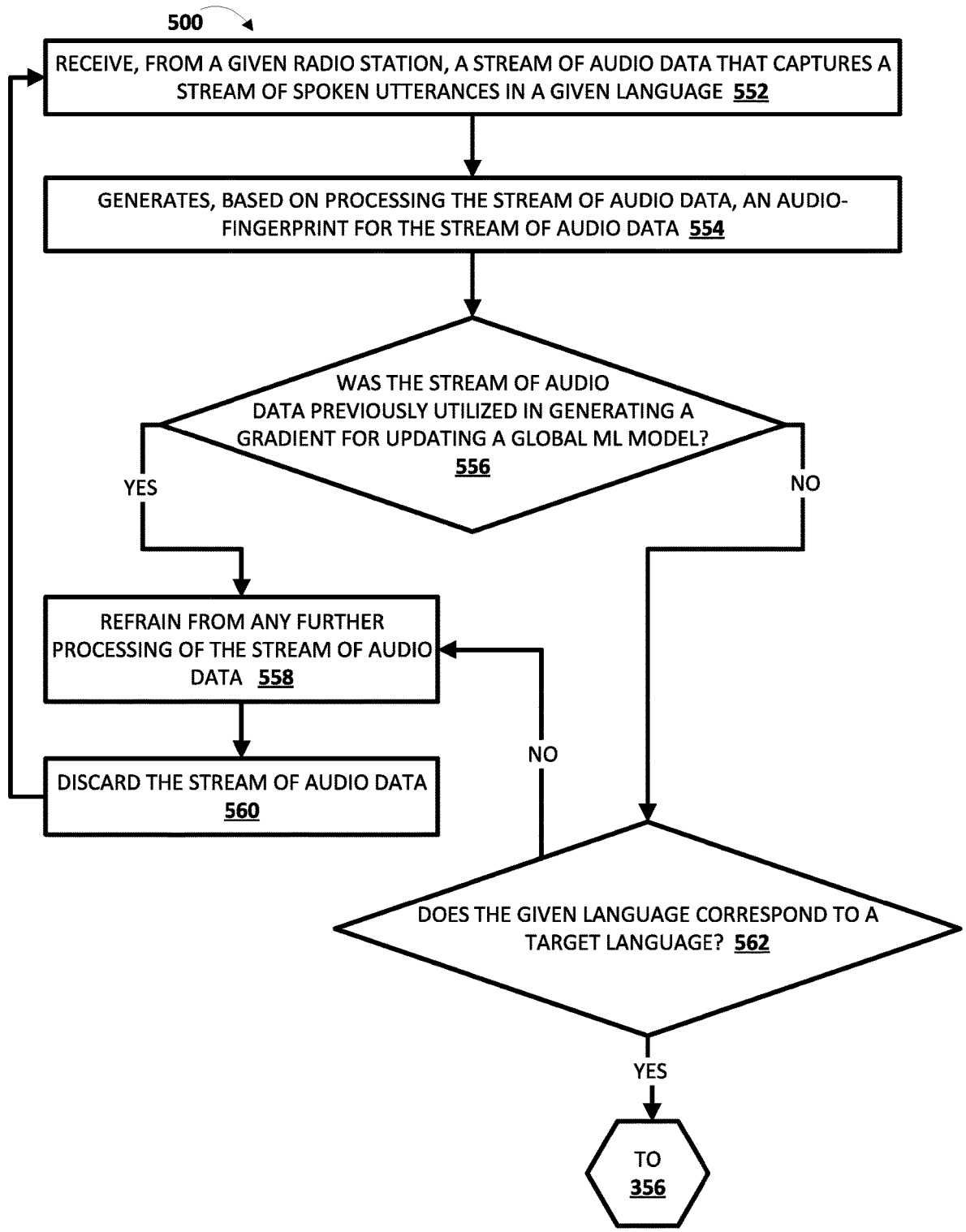
FIG. 5 depicts a flowchart illustrating an example method of deduplication techniques utilized in ephemeral learning implemented by a client device, in accordance with various implementations.

Turning now to FIG. 5, a flowchart illustrating an example method 500 of deduplication techniques utilized in ephemeral learning implemented by a client device is depicted. For convenience, the operations of the method 500 are described with reference to a system that performs the operations. The system of method 500 includes one or more processors and/or other component(s) of a client device (e.g., client device 120 of FIGS. 1A and 1B, client device 250 of FIG. 2, computing device 810 of FIG. 8, and/or other client devices). Moreover, while operations of the method 500 are shown in a particular order, this is not meant to be limiting. One or more operations may be reordered, omitted, or added.

At block 552, the system receives, from a given radio station, a stream of audio data that captures a stream of spoken utterances in a given language. The stream of spoken utterances may capture, for instance, spoken utterances that include commercial or advertisement content from the given radio station, spoken utterances that include disc jockey content from the given radio station, spoken utterances that include podcast content from the given radio station, spoken utterance that include music content from the given radio station, and/or other sources of content from the given radio station. However, in some implementations, the system may discard any streams of audio data that capture spoken utterances that include music content from the given radio station. In some implementations, the stream of audio data may be of a fixed length (e.g., 5 seconds, 10 seconds, 15 seconds, etc.). In additional or alternative implementations, the stream of audio data may be of a dynamic length (e.g., a length of commercial or advertisement content, a length of disc jockey, a length of podcast content, etc.). In some implementations, the stream of audio data may correspond to a stream of audio data that is being actively consumed by the user of the client device while the user is actively listening to the given radio station. In additional or alternative implementations, the stream of audio data may correspond to a stream of audio data that is accessible at the client device via the given radio station, but is not being actively consumed by the user of the client device.

At block 554, the system generates, based on processing the stream of audio data, an audio-fingerprint for the stream of audio data. In some implementations, the audio-fingerprint for the stream of audio data may correspond to an embedding. In some versions of these implementations, the system may process, using an encoder-decoder ML model or another ML model (e.g., stored in the on-device ML model(s) database 120A of FIGS. 1A and 1B), the stream of audio data to generate the embedding (or other lower dimensional representation of the audio data). Further, the embedding may be mapped to an embedding space (or another lower dimensional latent space) that enables the embedding to be compared to a plurality of previously generated embeddings (e.g., stored in the audio-fingerprint(s) database 144A of FIG. 1A) for previously encountered streams of audio data (e.g., as described with respect to block 556). In additional or alternative implementations, the audio-fingerprint for the stream of audio data may correspond to an audio hash. In some versions of these implementations, the system may process, using a local sensitivity hash (e.g., stored in the on-device ML model(s) database 120A of FIGS. 1A and 1B), to generate the audio hash (e.g., a vector representation of the stream of audio data). Further, this enables the audio hash to be compared to a plurality of previously generated audio hashes (e.g., stored in the audio-fingerprint(s) database 144A of FIG. 1A) for previously encountered streams of audio data (e.g., as described with respect to block 556).

At block 556, the system determines whether the stream of audio data was previously utilized in generating a gradient for updating a global ML model. For example, and in implementations where the audio-fingerprint corresponds to the embedding, if the embedding generated based on the stream of audio data matches a given previously generated embedding for a given previously encountered stream of audio data, then the system may determine that the stream of audio data was previously utilized in generating a gradient for updating the global ML model. For instance, the system may determine that the embedding generated based on the stream of audio data matches the given previously generated embedding if the embedding and the given previously generated embedding are within a threshold distance in the embedding space (e.g., using Euclidean distance, cosine similarity, and/or another distance measure). Otherwise, the system may determine that the embedding generated based on the stream of audio data does not match any given previously generated embedding.

As another example, and in implementations where the audio-fingerprint corresponds to the audio hash, if the audio hash generated based on the stream of audio data matches a given previously generated audio hash for a given previously encountered stream of audio data, then the system may determine that the stream of audio data was previously utilized in generating a gradient for updating the global ML model. For instance, the system may determine that the audio hash generated based on the stream of audio data matches the given previously generated audio hash if the corresponding vectors representing the streams of audio data satisfy a similarity threshold. Otherwise, the system may determine that the embedding generated based on the stream of audio data does not match any given previously generated embedding.

Notably, in these implementations, a remote system that is communicatively coupled to a population of client devices (e.g., that includes the client device) may maintain and periodically distribute the database of audio-fingerprints (e.g., the audio-fingerprints database 186A of FIG. 1B). For instance, each of the client device of the population may generate and transmit the audio-fingerprints generated locally at the client devices to the remote system, and the remote system may store the audio-fingerprints in the database of audio-fingerprints, and along with any audio-fingerprints generated at the remote system. Further, the remote system may distribute the database of audio-fingerprints (or updates thereto) to each of the client devices of the population to ensure that respective databases of audio-fingerprints (e.g., the audio-fingerprints database 144A of FIG. 1A) are up-to-date. This ensures that the population of client devices does not continually generate gradients based on the same streams of audio data and ensures sufficient diversity of streams of audio data in generating gradients that are utilized in updating the global ML model.

If, at an iteration of block 556, the system determines that the stream of audio data was previously utilized in generating a gradient for updating a global ML model, then the system may proceed to block 558. At block 558, the system refrains from any further processing of the stream of audio data. At block 560, the system discards the stream of audio data. The system may return to block 552 to perform an additional iteration of the method 500.

If, at an iteration of block 556, the system determines that the stream of audio data was previously utilized in generating a gradient for updating a global ML model, then the system may proceed to block 562. At block 562, the system determines whether the given language corresponds to a target language. For example, the system may process, using a language identification model (e.g., stored in the on-device ML model(s) database 120A), the stream of audio data (or recognized text generated based on processing the stream of audio data (e.g., generated using a multilingual ASR model)) to identify the given language associated with the stream of spoken utterances captured in the stream of audio data. Further, the system may compare the given language to one or more target languages (e.g., stored in the target language(s) database 142A of FIG. 1) to determine whether to generate a gradient to be utilized in updating the global ML with respect to the given language. Put another way, the system may discard streams of audio data that capture spoken utterances in some languages, while continuing to process streams of audio data that capture spoken utterances in other languages.

If, at an iteration of block 562, the system determines that the given language does not correspond to the target language, then the system may proceed to block 558. At block 558, the system refrains from any further processing of the stream of audio data. At block 560, the system discards the stream of audio data. The system may return to block 552 to perform an additional iteration of the method 500. If, at an iteration of block 562, the system determines that the given language corresponds to the target language, then the system may proceed to block 356 of the method 300 of FIG. 3 to determine whether to perform ephemeral learning locally at the client device or remotely at the client device. Put another way, the system may cause the client device to perform these deduplication techniques to reduce a quantity of computational and/or network resources that would otherwise be consumed in processing streams of audio data that have been previously processed. Further, and assuming that the system determines that the gradient has not been previously utilized in generating a gradient for utilization in updating the global ML model, the system may implement ephemeral learning locally at the client device and remotely from the client device.

Although the method 500 of FIG. 5 is described in a particular manner, it should be understood that is for the sake of example, and is not meant to be limiting. For example, the deduplication operations of block 556 and block 562 may be switched such that the language identification deduplication technique is performed prior to the audio-fingerprinting deduplication technique. Also, for example, one of the deduplication operations of block 556 and block 562 may be omitted such that only the language identification deduplication technique is performed or only the audio-fingerprinting deduplication technique is performed.

Figure 6:
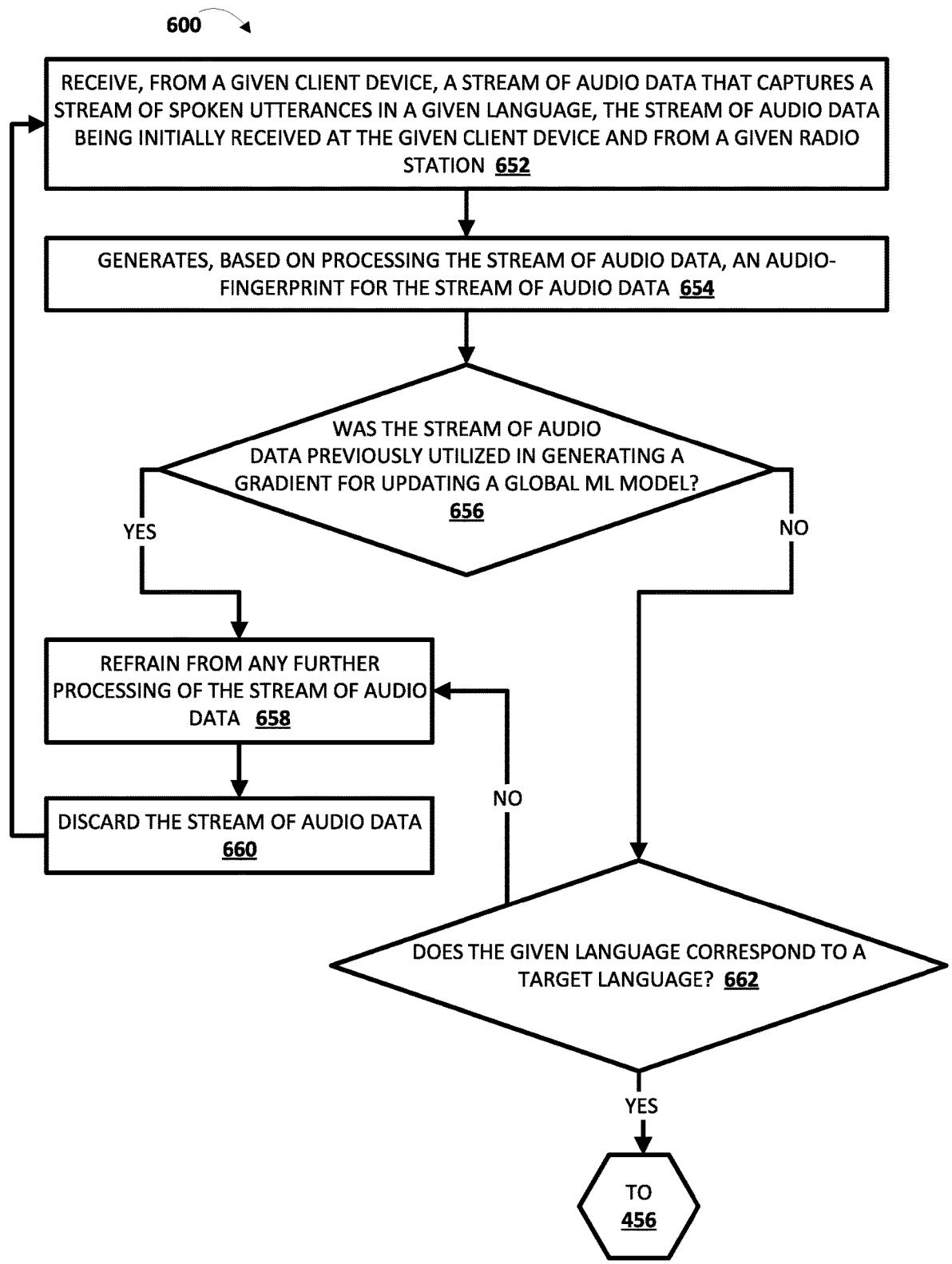
FIG. 6 depicts a flowchart illustrating an example method of deduplication techniques utilized in ephemeral learning implemented by a remote system, in accordance with various implementations.

Turning now to FIG. 6, a flowchart illustrating an example method 600 of deduplication techniques utilized in ephemeral learning implemented by a remote system is depicted. For convenience, the operations of the method 600 are described with reference to a system that performs the operations. The system of method 600 includes one or more processors and/or other component(s) of a remote system (e.g., remote system 160 of FIGS. 1A and 1B, cloud-based automated assistant component(s) 270 of FIG. 2, computing device 810 of FIG. 8, and/or other remote systems). Moreover, while operations of the method 600 are shown in a particular order, this is not meant to be limiting. One or more operations may be reordered, omitted, or added.

At block 652, the system receives, from a given client device, a stream of audio data that captures a stream of spoken utterances in a given language, the stream of audio data being initially received at the given client device and from a given radio station. At block 654, the system generates, based on processing the stream of audio data, an audio-fingerprint for the stream of audio data At block 656, the system determines whether the stream of audio data was previously utilized in generating a gradient for updating a global ML model. If, at an iteration of block 656, the system determines that the stream of audio data was previously utilized in generating a gradient for updating a global ML model, then the system may proceed to block 658. At block 658, the system refrains from any further processing of the stream of audio data. At block 660, the system discards the stream of audio data. The system may return to block 652 to perform an additional iteration of the method 600. If, at an iteration of block 656, the system determines that the stream of audio data was previously utilized in generating a gradient for updating a global ML model, then the system may proceed to block 662.

At block 662, the system determines whether the given language corresponds to a target language. If, at an iteration of block 662, the system determines that the given language does not correspond to the target language, then the system may proceed to block 658. At block 658, the system refrains from any further processing of the stream of audio data. At block 660, the system discards the stream of audio data. The system may return to block 652 to perform an additional iteration of the method 600. If, at an iteration of block 662, the system determines that the given language corresponds to the target language, then the system may proceed to block 456 of the method 400 of FIG. 4 and utilize ephemeral learning at the remote system to generate the gradient for updating the global ML model.

Put another way, the method 600 of FIG. 6 is the same or similar as the method 500 of FIG. 5, but the system is implemented by the remote system according to the method 600 of FIG. 6, rather than the client device according to the method 500 of FIG. 5. Notably, in these implementations, the stream of audio data may be initially received by the given client device, but the operations of the method 600 of FIG. 6 may be performed by components that are specific to the remote system. Moreover, although the method 600 of FIG. 6 is described with respect to a single client device and a single stream of audio data, it should be understood that is for the sake of example and is not meant to be limiting. Rather, it should be understood that the system may cause multiple iterations of the method 600 of FIG. 6 to be performed in parallel based on different streams of audio data received from different client devices.

Figure 7:
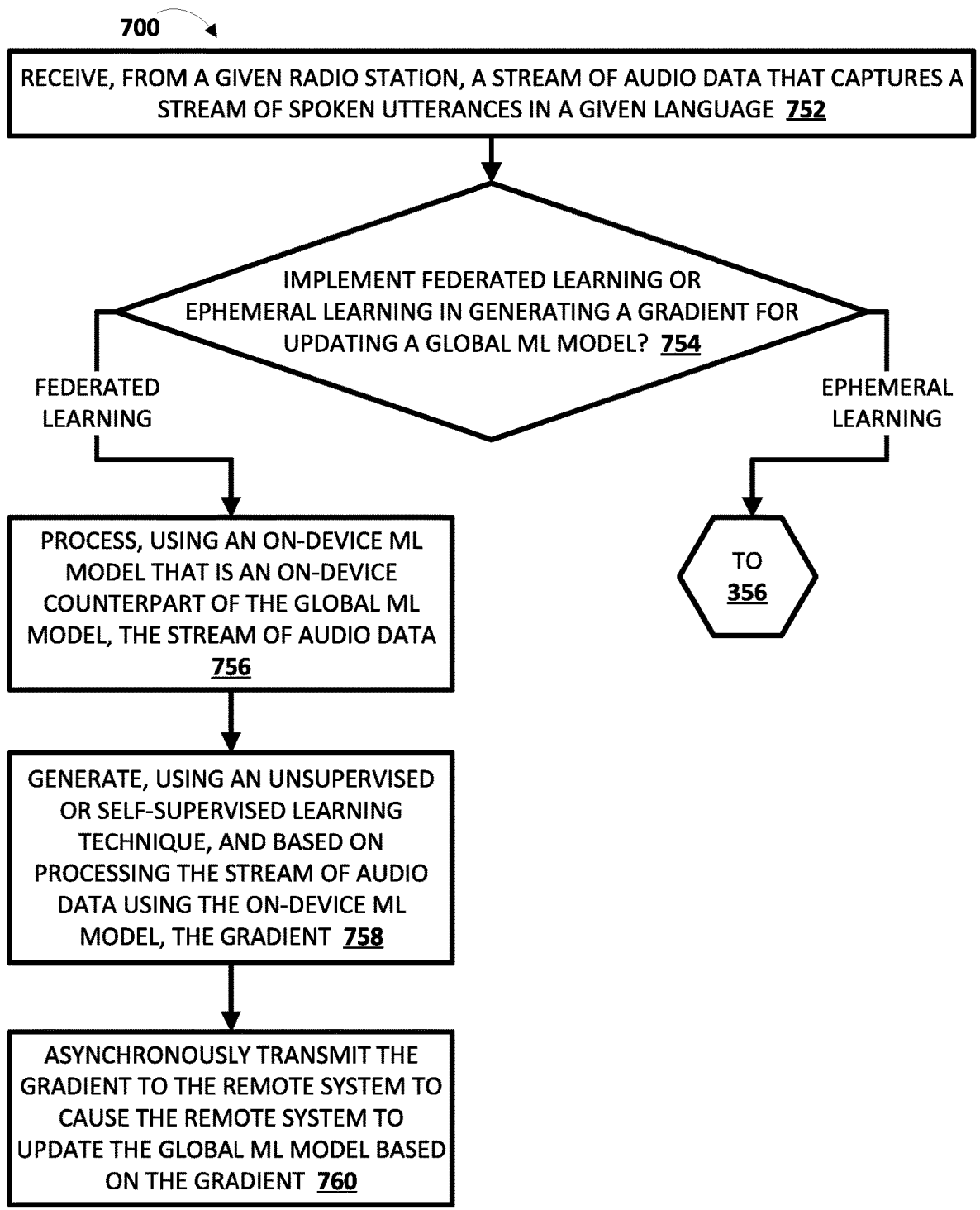
FIG. 7 depicts a flowchart illustrating an example method of determining whether a client device should implement an ephemeral learning technique or a federated learning technique, in accordance with various implementations.

Turning now to FIG. 7, a flowchart illustrating an example method 700 of determining whether a client device should implement an ephemeral learning technique or a federated learning technique is depicted. For convenience, the operations of the method 700 are described with reference to a system that performs the operations. The system of method 700 includes one or more processors and/or other component(s) of a client device (e.g., client device 120 of FIGS. 1A and 1B, client device 250 of FIG. 2, computing device 810 of FIG. 8, and/or other client devices). Moreover, while operations of the method 700 are shown in a particular order, this is not meant to be limiting. One or more operations may be reordered, omitted, or added.

At block 752, the system receives, from a given radio station, a stream of audio data that captures a stream of spoken utterances in a given language (e.g., in the same or similar manner described with respect to block 552 of the method 500 of FIG. 5).

At block 754, the system determines whether to implement federated learning or ephemeral learning in generating a gradient for updating a global ML model. For example, the system may determine whether to implement federated learning or ephemeral learning based on a connection status between a client device that received the stream of audio data and a remote system and/or a connection strength between the client device and the remote system (e.g., as described with respect to the connection status engine 140 of FIG. 1A). Additionally, or alternatively, the system may determine whether to implement federated learning or ephemeral learning based on a location of the client device. For example, if the location of the client device is located within a particular geographical region, then the system may determine to implement federated learning rather than ephemeral learning.

If, at an iteration of block 754, the system determines to implement federated learning, then the system may proceed to block 756. At block 756, the system processes, using an on-device ML model that is an on-device counterpart of the global ML model, the stream of audio data. At block 758, the system generates, using an unsupervised or self-supervised learning technique, and based on processing the stream of audio data using the on-device ML model, the gradient. At block 760, the system asynchronously transmits the gradient to the remote system to cause the remote system to update the global ML model based on the gradient. The operations of block 756 and block 758 may be performed in the same or similar manner described with respect to the operations of block 358 and block 360 of the method 300 of FIG. 3, respectively.

However, and in contrast with the operations of block 364 of the method 300 of FIG. 3, the transmitting of the gradient to the remote system at block 760 is asynchronous. In these implementations, the system may have determined to implement federated learning to generate the gradient based on a weak and/or unstable connection between the client device and the remote system. Accordingly, rather than attempting to transmit the gradient to the remote system in response to the system causing the gradient to be generated locally at the client device, the system may store the gradient in transient memory or storage of the client device due the weak and/or unstable connection between the client device and the remote system. Nonetheless, the system may cause the gradient to be transmitted to the remote system to cause the remote system to update the global ML model based on the gradient when a strong and/or stable connection is subsequently established between the client device and the remote system (e.g., over a Wi-Fi network, a cellular network, etc.). In some versions of these implementations, the stream of audio data may be discarded in response to the gradient being generated, whereas in other versions of these implementations, the system may store the stream of audio data in the transient memory or storage of the client device until the gradient is transmitted to the remote system in the asynchronous manner and then discard the stream of audio data.

If, at an iteration of block 754, the system determines to implement ephemeral learning, then the system may proceed to block 356 of the method 300 of FIG. 3. Put another way, the system may cause the client device to determine whether to implement ephemeral learning or federated learning in generating the gradient. Further, and assuming that the system determines to implement ephemeral learning based on a strong and/or stable connection between the client device and the remote system, the system may proceed to block 356 of the method 300 of FIG. 3 to determine whether to generate the gradient locally at the client device or remotely from the client device. In implementations where the system determines to implement ephemeral learning locally at the client device at an iteration of block 356, the system may transmit the gradient to the remote system in a synchronous manner at an iteration of block 364 (e.g., in response to the gradient being generated) and without storing the gradient in the transient memory or storage of the client device. In implementations where the system determines to implement ephemeral learning remotely from the client device at an iteration of block 356, the system may transmit the stream of audio data to the remote system in a synchronous manner at an iteration of block 366.

Although the method 700 of FIG. 7 and the method 500 of FIG. 5 are described as separate methods, it should be understood that is for the sake of illustrating techniques described herein and is not meant to be limiting. For example, techniques described with respect to the method 700 of FIG. 7 and the method 500 of FIG. 5 (or some aspects thereof) may be combined into a single method.

Figure 8:
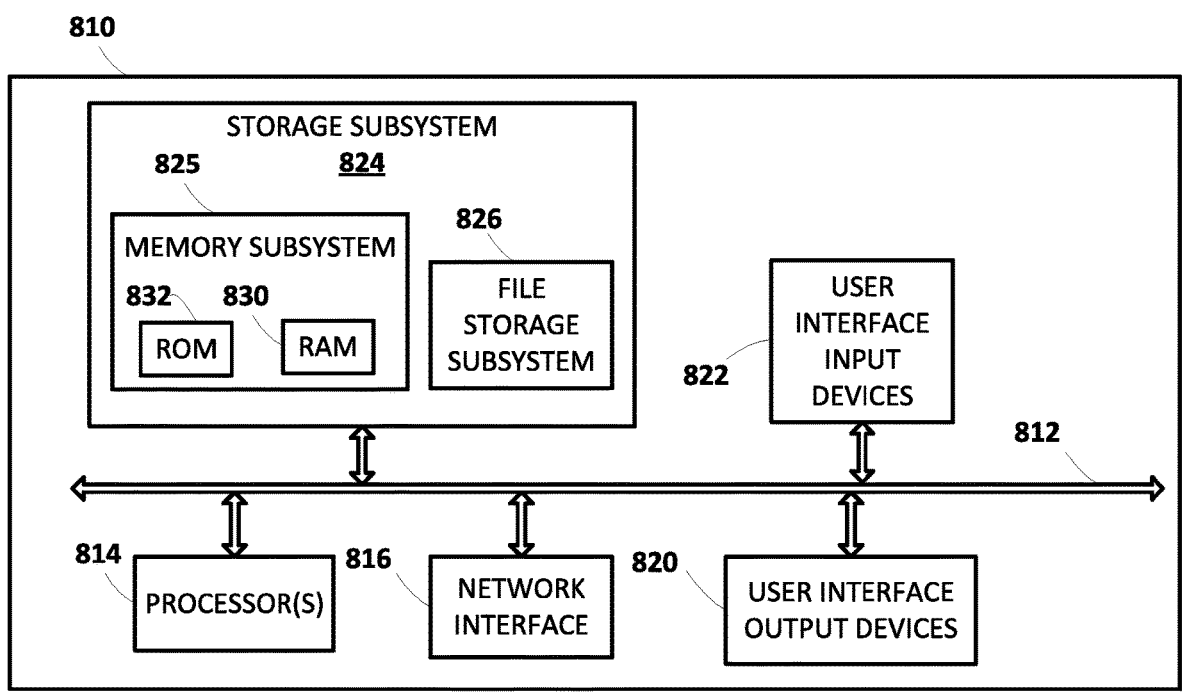
FIG. 8 depicts an example architecture of a computing device, in accordance with various implementations.

Turning now to FIG. 8, a block diagram of an example computing device 810 that may optionally be utilized to perform one or more aspects of techniques described herein is depicted. In some implementations, one or more of a client device, cloud-based automated assistant component(s), and/ or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods disclosed herein, as well as to implement various components depicted in FIGS. 1A, 1B, and 2.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method performed by one or more processors of a client device is provided and includes receiving, from a given radio station, a stream of audio data that captures a stream of spoken utterances in a given language; generating, based on processing the stream of audio data, an audio-fingerprint for the stream of audio data; determining, based on comparing the audio-fingerprint for the stream of audio data to a database of audio-fingerprints, whether the stream of audio data has been previously utilized in generating a gradient for updating a global machine learning (ML) model with respect to the given language; and in response to determining that the stream of audio data has not been previously utilized in generating a gradient for updating the global ML model with respect to the given language: processing, using an on-device ML model that is stored in on-device storage of the client device and that is an on-device counterpart of the global ML model, the stream of audio data; generating, using an unsupervised or self-supervised learning technique, and based on processing the stream of audio data using the on-device ML model, the gradient; and transmitting the gradient to the remote system to be utilized in updating the global ML model with respect to the given language.

These and other implementations of the technology can include one or more of the following features.

In some implementations, the method may further include, in response to determining that the stream of audio data has been previously utilized in generating a gradient for updating the global ML model with respect to the given language: discarding the stream of audio data.

In some implementations, the method may further include receiving, from the remote system, the database of audio-fingerprints; and storing, in the on-device storage of the client device, the database of audio-fingerprints. In some versions of those implementations, the remote system may have been previously generated the database of audio-fingerprints based on a plurality of corresponding streams of audio data that that are received from the client device and a plurality of additional client devices, and that capture corresponding streams of spoken utterances in a plurality of different languages, including the given language, and from a plurality of different radio stations.

In some implementations, generating the audio-fingerprint for the stream of audio data based on processing the stream of audio data may include processing, using a local sensitivity hash, the stream of audio data to generate an audio hash as the audio-fingerprint. In some versions of those implementations, determining whether the stream of audio data has been previously utilized in generating a gradient for updating a global ML model with respect to the given language based on comparing the audio-fingerprint for the stream of audio data to a database of audio-fingerprints may include comparing the audio hash generated based on processing the stream of audio data to a plurality of previously generated audio hashes, and determining, based on the comparing, whether the stream of audio data has been previously utilized in generating a gradient for updating a global ML model with respect to the given language. The plurality of previously generated audio hashes may have been previously generated based on processing corresponding streams of audio data, and the plurality of previously generated audio hashes may be stored in the database of audio-fingerprints.

In some implementations, generating the audio-fingerprint for the stream of audio data based on processing the stream of audio data may include processing, using an encoder portion of an encoder-decoder ML model, the stream of audio data to generate an embedding as the audio-fingerprint. In some versions of those implementations, determining whether the stream of audio data has been previously utilized in generating a gradient for updating a global ML model with respect to the given language based on comparing the audio-fingerprint for the stream of audio data to a database of audio-fingerprints may include comparing the embedding generated based on processing the stream of audio data to a plurality of previously generated embeddings, and determining, based on the comparing, whether the stream of audio data has been previously utilized in generating a gradient for updating a global ML model with respect to the given language. The plurality of previously generated embeddings may have been previously generated based on processing corresponding streams of audio data, and the plurality of previously generated embeddings may be stored in the database of audio-fingerprints.

In some implementations, the method may further include processing, using an on-device language identification model that is stored in the on-device storage of the client device, the stream of audio data to identify the given language, and determining whether the given language is one of a plurality of target languages. In some versions of those implementations, generating the audio-fingerprint for the stream of audio data may be in response to determining that the given language is one of the plurality of target languages. In some versions of those implementations, the method may further include, in response to determining that the given language is not one of the plurality of target languages: refraining from any further processing of the stream of audio data; and discarding the stream of audio data. In some versions of those implementations, a developer associated with the global ML model may provide an indication of the plurality of target languages.

In some implementations, the remote system may utilize the gradient to update one or more global weights of the global ML model to generate an updated global ML model. In some versions of those implementations, the method may further include receiving, from the remote system, the one or more global weights of the updated global ML model, or receiving, from the remote system, the updated global ML model. In some further versions of those implementations, the method may further include replacing, in the on-device storage of the client device, one or more on-device weights of the on-device ML model with the one or more global weights of the updated global ML model, or replacing, in the on-device storage of the client device, the on-device ML model with the updated global ML model.

In some implementations, the unsupervised or self-supervised learning technique may include one or more of: a teacher-student technique, or a masking technique.

In some implementations, the global ML model may be a global feature extractor model that is updated to extract features from the stream of audio data with respect to the given language.

In some implementations, the global ML model may be a multilingual automatic speech recognition (ASR) model that is updated to recognize text from the stream of audio data with respect to the given language.

In some implementations, a method performed by one or more processors of a client device is provided and includes receiving, from a given radio station, a stream of audio data that captures a stream of spoken utterances in a given language; generating, based on processing the stream of audio data, an audio-fingerprint for the stream of audio data; determining, based on comparing the audio-fingerprint for the stream of audio data to a database of audio-fingerprints, whether the stream of audio data has been previously utilized in generating a gradient for updating a global machine learning (ML) model with respect to the given language; and in response to determining that the stream of audio data has not been previously utilized in generating a gradient for updating the global ML model with respect to the given language: transmitting the stream of audio data to the remote system. Transmitting the stream of audio data to the remote system causes the remote system to: process, using the global ML model, the stream of audio data; generate, using the unsupervised or self-supervised learning technique, and based on processing the stream of audio data using the global ML model, the gradient; and update, based on the gradient, the global ML model.

These and other implementations of the technology can include one or more of the following features.

In some implementations, transmitting the stream of audio data to the remote system may further cause the remote system to, subsequent to generating the gradient, discard the stream of audio data.

In some implementations, a method performed by one or more processors of a remote system is provided and includes receiving, from a given client device, a stream of audio data that captures a stream of spoken utterances in a given language, the stream of audio data being initially received at the given client device from a given radio station; generating, based on processing the stream of audio data, an audio-fingerprint for the stream of audio data; determining, based on comparing the audio-fingerprint for the stream of audio data to a database of audio-fingerprints, whether the stream of audio data has been previously utilized in generating a gradient for updating a global machine learning (ML) model with respect to the given language; and in response to determining that the stream of audio data has not been previously utilized in generating a gradient for updating the global ML model with respect to the given language: processing, using the global ML model, the stream of audio data; generating, using an unsupervised or self-supervised learning technique, and based on processing the stream of audio data using the global ML model, the gradient; and updating, based on the gradient, the global ML model with respect to the given language.

In some implementations, a method performed by one or more processors of a client device is provided and includes receiving, from a given radio station, a stream of audio data that captures a stream of spoken utterances in a given language; determining, based on a connection status between the client device and a remote system, whether to implement federated learning or ephemeral learning to generate a gradient for updating a global machine learning (ML) model with respect to the given language; in response to determining to implement federated learning to generate the gradient for utilization in updating the global ML model with respect to the given language: processing, using an on-device ML model that is stored in on-device storage of the client device and that is an on-device counterpart of the global ML model, the stream of audio data; generating, using an unsupervised or self-supervised learning technique, and based on processing the stream of audio data using the on-device ML model, the gradient; and asynchronously transmitting the gradient to the remote system to be utilized in updating the global ML model with respect to the given language; and in response to determining to implement ephemeral learning to generate the gradient for utilization in updating the global ML model with respect to the given language: processing, using the on-device ML model, the stream of audio data; generating, using the unsupervised or self-supervised learning technique, and based on processing the stream of audio data using the on-device ML model, the gradient; and synchronously transmitting the gradient to the remote system to be utilized in updating the global ML model with respect to the given language.

These and other implementations of the technology can include one or more of the following features.

In some implementations, the method may further include determining to implement federated learning to generate the gradient for utilization in updating the global ML model with respect to the given language based on the connection status between the client device and the remote system indicating that the client device cannot connect to the remote system. In some versions of those implementations, asynchronously transmitting the gradient to the remote system to be utilized in updating the global ML model with respect to the given language may include, subsequent to generating the gradient: determining that a connection has been established between the client device and the remote system; and in response to determining that the connection has been established between the client device and the remote system: transmitting the gradient to the remote system to be utilized in updating the global ML model with respect to the given language.

In some implementations, the method may further include determining to implement ephemeral learning to generate the gradient for utilization in updating the global ML model with respect to the given language based on the connection status between the client device and the remote system indicating that the client device is connected to the remote system. In some versions of those implementations, synchronously transmitting the gradient to the remote system to be utilized in updating the global ML model with respect to the given language may include transmitting the gradient to the remote system to be utilized in updating the global ML model with respect to the given language without any connection having to be subsequently established between the client device and the remote system.

In some implementations, determining whether to implement federated learning or ephemeral learning to generate a gradient for updating a global ML model with respect to the given language may be further based on a location of the client device.

In some implementations, a method performed by one or more processors of a client device is provided and includes receiving, from a given radio station, a stream of audio data that captures a stream of spoken utterances in a given language; determining, based on a connection status between the client device and a remote system, whether to implement federated learning or ephemeral learning to generate a gradient for updating a global machine learning (ML) model with respect to the given language; in response to determining to implement federated learning to generate the gradient for utilization in updating the global ML model with respect to the given language: processing, using an on-device ML model that is stored in on-device storage of the client device and that is an on-device counterpart of the global ML model, the stream of audio data; generating, using an unsupervised or self-supervised learning technique, and based on processing the stream of audio data using the on-device ML model, the gradient; and asynchronously transmitting the gradient to the remote system to be utilized in updating the global ML model with respect to the given language; and in response to determining to implement ephemeral learning to generate the gradient for utilization in updating the global ML model with respect to the given language: synchronously transmitting the stream of audio data to the remote system. Synchronously transmitting the stream of audio data to the remote system causes the remote system to: process, using the global ML model, the stream of audio data; generate, using the unsupervised or self-supervised learning technique, and based on processing the stream of audio data using the global ML model, the gradient; and update, based on the gradient, the global ML model.

These and other implementations of the technology can include one or more of the following features.

In some implementations, synchronously transmitting the stream of audio data to the remote system may further cause the remote system to: discard the stream of audio data subsequent to generating the gradient.

In some implementations, a method performed by one or more processors of a client device is provided and includes receiving, from a given radio station being actively consumed by a user of the client device, a stream of audio data that captures a stream of spoken utterances in a given language; and causing a gradient, for updating a global machine learning (ML) model with respect to the given language and at a remote system, to be generated. In some versions of those implementations, causing the gradient to be generated includes processing, using an on-device ML model that is stored in on-device storage of the client device and that is an on-device counterpart of the global ML model, the stream of audio data; generating, using an unsupervised or self-supervised learning technique, and based on processing the stream of audio data using the on-device ML model, the gradient; discarding the stream of audio data; and transmitting the gradient to the remote system to be utilized in updating the global ML model with respect to the given language. In other implementations, causing the gradient to be generated includes transmitting the stream of audio data to the remote system. Transmitting the stream of audio data to the remote system causes the remote system to: process, using the global ML model, the stream of audio data; generate, using the unsupervised or self-supervised learning technique, and based on processing the stream of audio data using the global ML model, the gradient; discard the stream of audio data; and update, based on the gradient, the global ML model.

In some implementations, a method performed by one or more processors of a remote system is provided and includes receiving, from a given client device, a stream of audio data that captures a stream of spoken utterances in a given language, the stream of audio data being initially received at the given client device from a given radio station that is being actively consumed by a user of the given client device; processing, using a global machine learning (ML) model, the stream of audio data; generating, using an unsupervised or self-supervised learning technique, and based on processing the stream of audio data using the global ML model, a gradient; discarding the stream of audio data; and updating, based on the gradient, the global ML model with respect to the given language.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

What is claimed is:

1. A method implemented by one or more processors of a client device, the method comprising:
   receiving, from a given radio station, a stream of audio data that captures a stream of spoken utterances in a given language;
   generating, based on processing the stream of audio data, an audio-fingerprint for the stream of audio data;
   determining, based on comparing the audio-fingerprint for the stream of audio data to a database of audio-fingerprints, whether the stream of audio data has been previously utilized in generating a gradient for updating a global machine learning (ML) model with respect to the given language; and
   in response to determining that the stream of audio data has not been previously utilized in generating a gradient for updating the global ML model with respect to the given language:
      processing, using an on-device ML model that is stored in on-device storage of the client device and that is an on-device counterpart of the global ML model, the stream of audio data;
      generating, using an unsupervised or self-supervised learning technique, and based on processing the stream of audio data using the on-device ML model, the gradient; and
      transmitting the gradient to the remote system to be utilized in updating the global ML model with respect to the given language.

2. The method of claim 1, further comprising:
   in response to determining that the stream of audio data has been previously utilized in generating a gradient for updating the global ML model with respect to the given language:
      discarding the stream of audio data.

3. The method of claim 1, further comprising:
   receiving, from the remote system, the database of audio-fingerprints; and
   storing, in the on-device storage of the client device, the database of audio-fingerprints.

4. The method of claim 3, wherein the remote system previously generated the database of audio-fingerprints based on a plurality of corresponding streams of audio data that that are received from the client device and a plurality of additional client devices, and that capture corresponding streams of spoken utterances in a plurality of different languages, including the given language, and from a plurality of different radio stations.

5. The method of claim 1, wherein generating the audio-fingerprint for the stream of audio data based on processing the stream of audio data comprises:
   processing, using a local sensitivity hash, the stream of audio data to generate an audio hash as the audio-fingerprint.

6. The method of claim 5, wherein determining whether the stream of audio data has been previously utilized in generating a gradient for updating a global ML model with respect to the given language based on comparing the audio-fingerprint for the stream of audio data to a database of audio-fingerprints comprises:
   comparing the audio hash generated based on processing the stream of audio data to a plurality of previously generated audio hashes, wherein the plurality of previously generated audio hashes were previously generated based on processing corresponding streams of audio data, and wherein the plurality of previously generated audio hashes are stored in the database of audio-fingerprints; and
   determining, based on the comparing, whether the stream of audio data has been previously utilized in generating a gradient for updating a global ML model with respect to the given language.

7. The method of claim 1, wherein generating the audio-fingerprint for the stream of audio data based on processing the stream of audio data comprises:
   processing, using an encoder portion of an encoder-decoder ML model, the stream of audio data to generate an embedding as the audio-fingerprint.

8. The method of claim 7, wherein determining whether the stream of audio data has been previously utilized in generating a gradient for updating a global ML model with respect to the given language based on comparing the audio-fingerprint for the stream of audio data to a database of audio-fingerprints comprises:
   comparing the embedding generated based on processing the stream of audio data to a plurality of previously generated embeddings, wherein the plurality of previously generated embeddings were previously generated based on processing corresponding streams of audio data, and wherein the plurality of previously generated embeddings are stored in the database of audio-fingerprints; and
   determining, based on the comparing, whether the stream of audio data has been previously utilized in generating a gradient for updating a global ML model with respect to the given language.

9. The method of claim 1, further comprising:
   processing, using an on-device language identification model that is stored in the on-device storage of the client device, the stream of audio data to identify the given language; and determining whether the given language is one of a plurality of target languages, wherein generating the audio-fingerprint for the stream of audio data is in response to determining that the given language is one of the plurality of target languages.

10. The method of claim 9, further comprising:
in response to determining that the given language is not one of the plurality of target languages:
refraining from any further processing of the stream of audio data; and
discarding the stream of audio data.

11. The method of claim 9, wherein a developer associated with the global ML model provides an indication of the plurality of target languages.

12. The method of claim 1, wherein the remote system utilizes the gradient to update one or more global weights of the global ML model to generate an updated global ML model.

13. The method of claim 12, further comprising:
receiving, from the remote system, the one or more global weights of the updated global ML model, or
receiving, from the remote system, the updated global ML model.

14. The method of claim 13, further comprising:
replacing, in the on-device storage of the client device, one or more on-device weights of the on-device ML model with the one or more global weights of the updated global ML model, or
replacing, in the on-device storage of the client device, the on-device ML model with the updated global ML model.

15. A method implemented by one or more processors of a client device, the method comprising:
receiving, from a given radio station, a stream of audio data that captures a stream of spoken utterances in a given language;
determining, based on a connection status between the client device and a remote system, whether to implement federated learning or ephemeral learning to generate a gradient for updating a global machine learning (ML) model with respect to the given language;
in response to determining to implement federated learning to generate the gradient for utilization in updating the global ML model with respect to the given language:
processing, using an on-device ML model that is stored in on-device storage of the client device and that is an on-device counterpart of the global ML model, the stream of audio data;
generating, using an unsupervised or self-supervised learning technique, and based on processing the stream of audio data using the on-device ML model, the gradient; and
asynchronously transmitting the gradient to the remote system to be utilized in updating the global ML model with respect to the given language; and
in response to determining to implement ephemeral learning to generate the gradient for utilization in updating the global ML model with respect to the given language:
processing, using the on-device ML model, the stream of audio data;
generating, using the unsupervised or self-supervised learning technique, and based on processing the stream of audio data using the on-device ML model, the gradient; and synchronously transmitting the gradient to the remote system to be utilized in updating the global ML model with respect to the given language.

16. The method of claim 15, further comprising:
determining to implement federated learning to generate the gradient for utilization in updating the global ML model with respect to the given language based on the connection status between the client device and the remote system indicating that the client device cannot connect to the remote system.

17. The method of claim 16, wherein asynchronously transmitting the gradient to the remote system to be utilized in updating the global ML model with respect to the given language comprises:
subsequent to generating the gradient:
determining that a connection has been established between the client device and the remote system; and
in response to determining that the connection has been established between the client device and the remote system:
transmitting the gradient to the remote system to be utilized in updating the global ML model with respect to the given language.

18. The method of claim 15, further comprising:
determining to implement ephemeral learning to generate the gradient for utilization in updating the global ML model with respect to the given language based on the connection status between the client device and the remote system indicating that the client device is connected to the remote system.

19. The method of claim 18, wherein synchronously transmitting the gradient to the remote system to be utilized in updating the global ML model with respect to the given language comprises:
transmitting the gradient to the remote system to be utilized in updating the global ML model with respect to the given language without any connection having to be subsequently established between the client device and the remote system.

20. A system comprising:
at least one processor; and
memory storing instructions that, when executed by the at least one processor, cause the at least one processor to be operable to:
receive, from a given radio station, a stream of audio data that captures a stream of spoken utterances in a given language;
generate, based on processing the stream of audio data, an audio-fingerprint for the stream of audio date;
determine, based on comparing the audio-fingerprint for the stream of audio data to a database of audio-fingerprints, whether the stream of audio data has been previously utilized in generating a gradient for updating a global machine learning (ML) model with respect to the given language; and
in response to determining that the stream of audio data has not been previously utilized in generating a gradient for updating the global ML model with respect to the given language:
process, using an on-device ML model that is stored in on-device storage of the client device and that is an on-device counterpart of the global ML model, the stream of audio date;
generate, using an unsupervised or self-supervised learning technique, and based on processing the stream of audio data using the on-device ML model, the gradient; and transmit the gradient to the remote system to be utilized in updating the global ML model with respect to the given language.

* * * * *